(12) United States Patent
Suzuki

(10) Patent No.: US 9,104,355 B2
(45) Date of Patent: Aug. 11, 2015

(54) TERMINAL APPARATUS AND PRINTER INTERACTING TO PERFORM PRINT FUNCTIONS USING DIFFERENT COMMUNICATION SCHEMES

(71) Applicant: Takanobu Suzuki, Nagoya (JP)
(72) Inventor: Takanobu Suzuki, Nagoya (JP)
(73) Assignee: Brother Kogyo Kabushiki Kaisha, Nagoya-shi, Aichi-ken (JP)
( * ) Notice: Subject to any disclaimer, the term of this patent is extended or adjusted under 35 U.S.C. 154(b) by 0 days.

(21) Appl. No.: 14/191,510
(22) Filed: Feb. 27, 2014
(65) Prior Publication Data
US 2014/0240774 A1 Aug. 28, 2014
(30) Foreign Application Priority Data
Feb. 28, 2013 (JP) ................................. 2013-040086

(51) Int. Cl.
*G06F 3/12* (2006.01)
*H04B 5/00* (2006.01)
(Continued)

(52) U.S. Cl.
CPC ............ *G06F 3/1236* (2013.01); *G06F 3/1203* (2013.01); *G06F 3/1292* (2013.01); *H04W 40/24* (2013.01); *G06F 3/1211* (2013.01)

(58) Field of Classification Search
CPC .......... H04N 1/00225; H04N 1/00244; H04N 1/0037; H04N 1/00408; H04N 1/00413; H04N 1/00416; H04N 1/00421; H04N 1/00432; H04N 1/00474; H04N 1/00973; H04N 2201/0036; H04N 2201/0039; H04N 2201/0041; H04N 2201/0044; H04N 2201/0055; H04N 2201/0096; H04N 1/00103; H04N 1/00204; H04N 1/00307; H04N 1/00915; H04N 2201/0048; H04N 2201/007; H04W 4/00; H04W 4/02; H04W 16/14; H04W 48/18; H04W 84/12; H04W 4/008; H04W 76/022; H04M 1/7253; H04M 2250/02; H04M 2250/04; H04M 2250/06

USPC ............ 358/1.15; 445/41.1, 41.2, 41.3, 179.1
See application file for complete search history.

(56) References Cited

U.S. PATENT DOCUMENTS 6,636,738 B1 * 10/2003 Hayashi ..................... 455/450
8,159,706 B2 * 4/2012 Kato ............................ 358/1.15
(Continued)

FOREIGN PATENT DOCUMENTS

| JP | 2007-096445 A | 4/2007 |
| JP | 2007-166538 A | 6/2007 |
| JP | 2011-146991 A | 7/2011 |

OTHER PUBLICATIONS

Co-pending U.S. Appl. No. 14/191,474, filed Feb. 27, 2014.
(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

A terminal apparatus may receive first information relating to a first function executing apparatus from the first function executing apparatus. The first function executing apparatus may be configured to execute a print function. The terminal apparatus may select, by using the first information, a particular communication scheme from among M1 items of communication schemes in a case where the first information is received. Each of the M1 items of communication schemes may be different from each other and may be a communication scheme available for the first function executing apparatus to receive print data. The terminal apparatus may send first print data to the first function executing apparatus in accordance with the particular communication scheme in a case where the particular communication scheme is selected from among the M1 items of communication schemes.

8 Claims, 23 Drawing Sheets

(51) Int. Cl.
*H04B 1/18* (2006.01)
*H04W 40/24* (2009.01)

(56) References Cited

U.S. PATENT DOCUMENTS

| | | | |
|---|---|---|---|
| 8,189,225 B1 * | 5/2012 | Lo et al. | 358/1.15 |
| 8,625,488 B1 * | 1/2014 | Gogate et al. | 370/328 |
| 8,665,480 B2 | 3/2014 | Wada et al. | |
| 2002/0051197 A1 | 5/2002 | Minegishi | |
| 2007/0041036 A1 | 2/2007 | Nakayama | |
| 2007/0280122 A1 | 12/2007 | Ito | |
| 2009/0092106 A1 | 4/2009 | Nakayama | |
| 2010/0081385 A1 | 4/2010 | Lin et al. | |
| 2010/0149602 A1 * | 6/2010 | Tamai et al. | 358/403 |
| 2011/0170686 A1 | 7/2011 | Goto | |
| 2011/0177780 A1 | 7/2011 | Sato et al. | |
| 2011/0317211 A1 * | 12/2011 | Yamada et al. | 358/1.15 |
| 2012/0081745 A1 | 4/2012 | Asai | |
| 2012/0236358 A1 * | 9/2012 | Huang | 358/1.15 |
| 2013/0229673 A1 * | 9/2013 | Nakayama et al. | 358/1.13 |
| 2013/0250354 A1 | 9/2013 | Kato et al. | |
| 2014/0366101 A1 * | 12/2014 | Murata | 726/4 |

OTHER PUBLICATIONS

Co-pending U.S. Appl. No. 14/191,476, filed Feb. 27, 2014.
Co-pending U.S. Appl. No. 14/191,513, filed Feb. 27, 2014.
Jul. 30, 2014—(US) Non-Final Office Action—U.S. Appl. No. 14/191,474.
Jul. 30, 2014—(US) Non-Final Office Action—U.S. Appl. No. 14/191,476.
Jul. 24, 2014—(EP) Extended Search Report—App 14157087.9.
Aug. 20, 2014—(US) Non-Final Office Action—U.S. Appl. No. 14/191,513.

* cited by examiner

FIG. 2 (Print Function Which MFP is capable of Executing)

FIG. 7 (First Embodiment)

FIG. 13 (First Embodiment) (Case B)

(Second Embodiment)

FIG. 17 (Second Embodiment)

FIG. 19 (Third Embodiment)

(Fourth Embodiment)

(Fourth Embodiment)

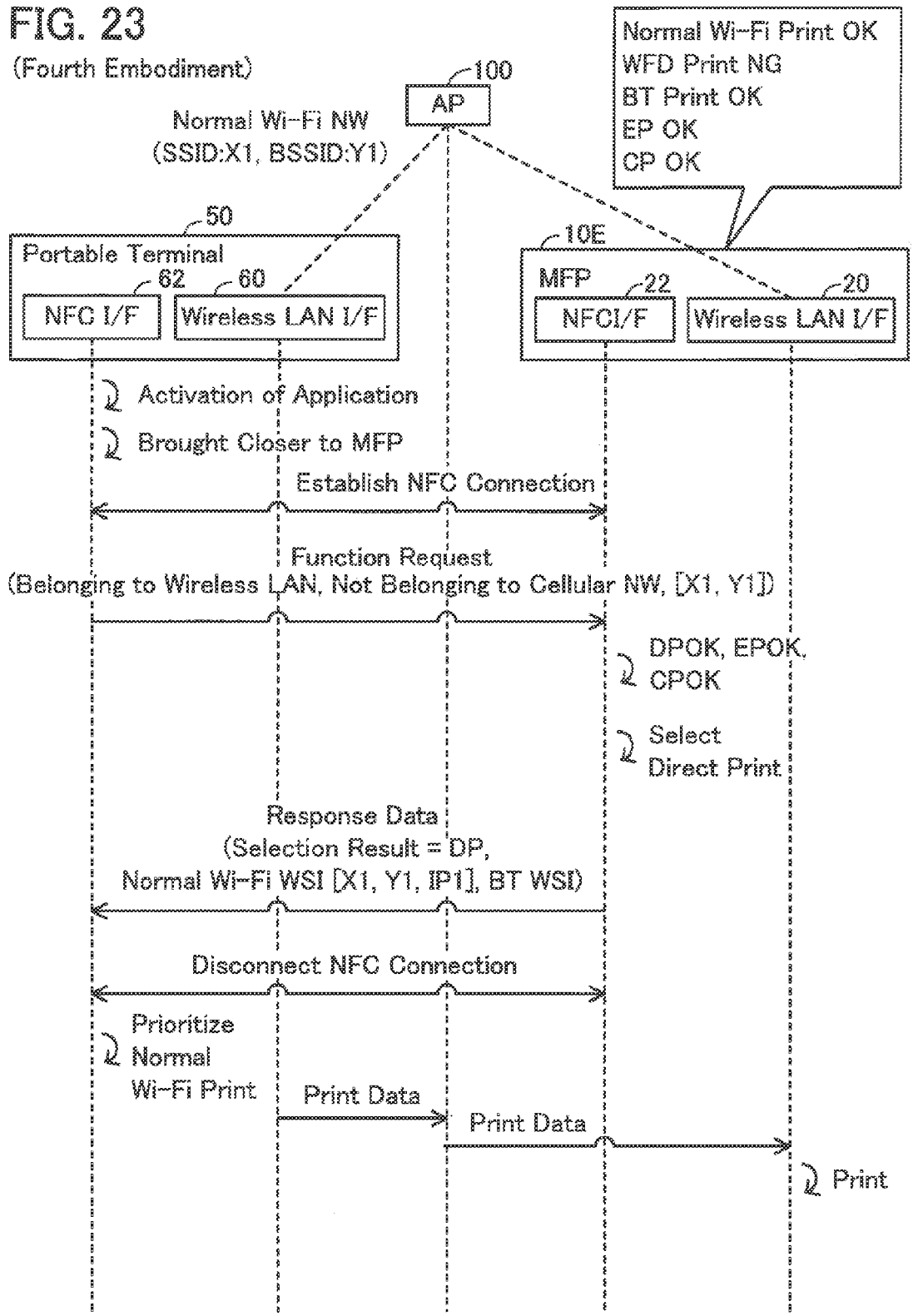

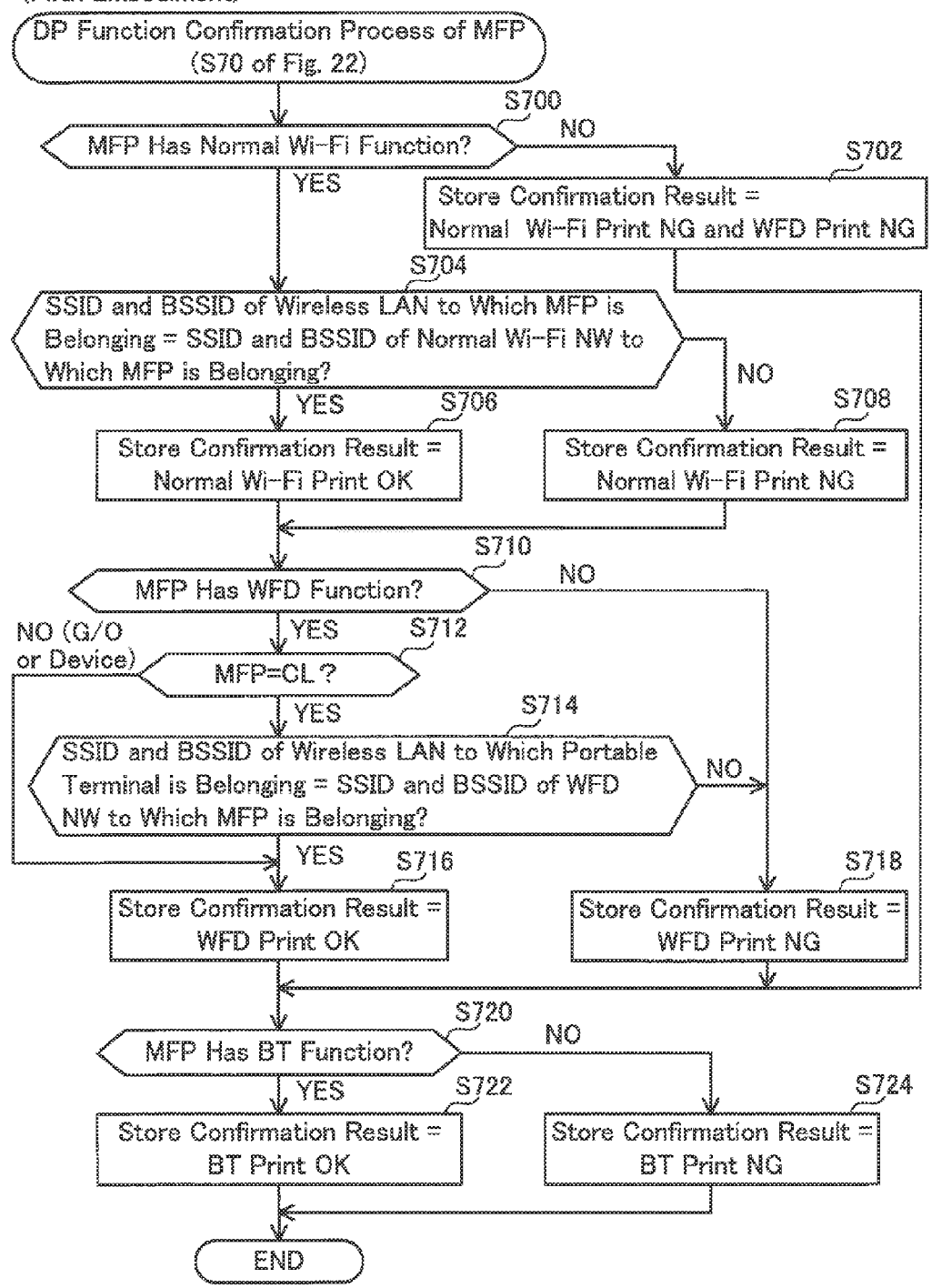

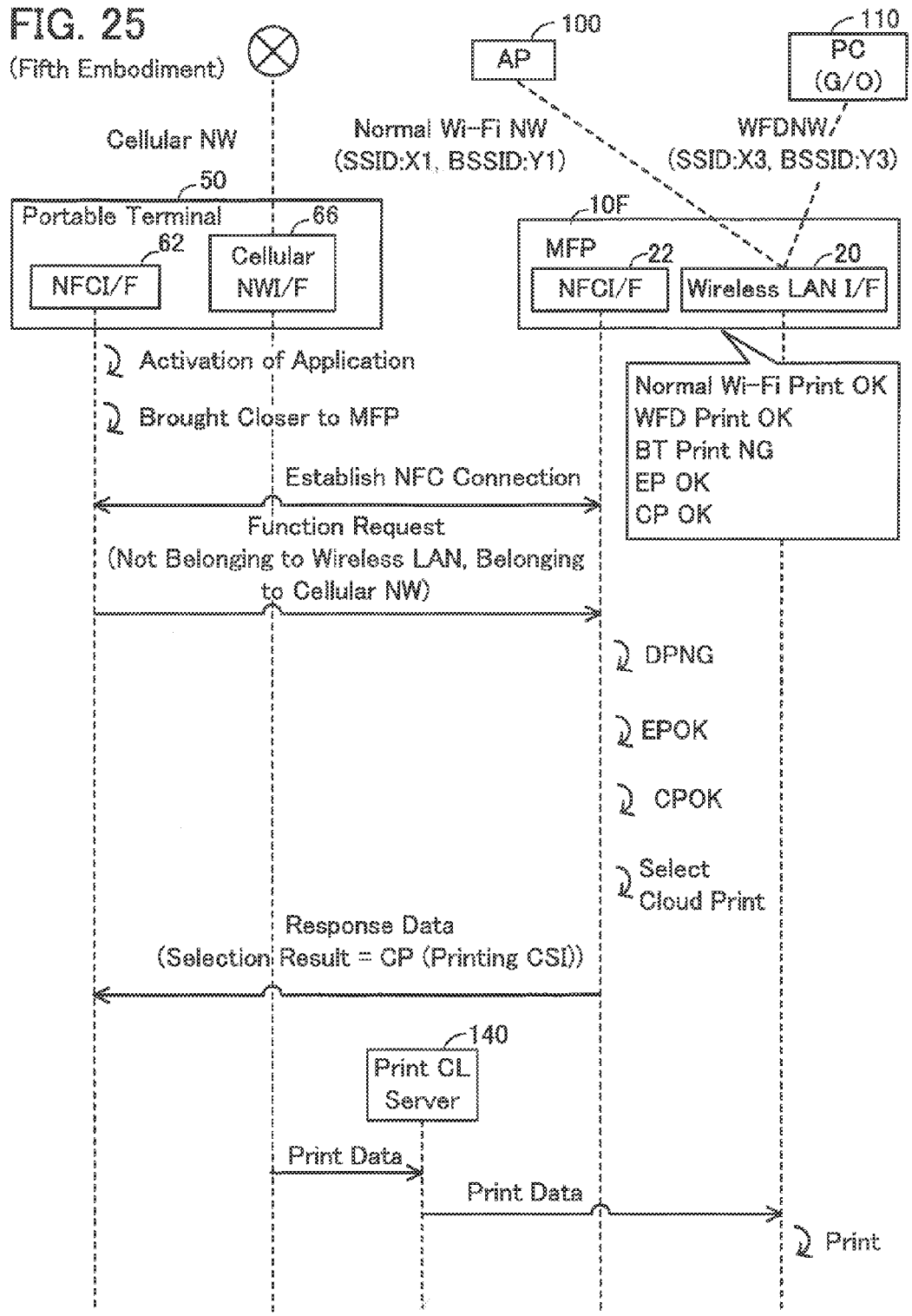

TERMINAL APPARATUS AND PRINTER INTERACTING TO PERFORM PRINT FUNCTIONS USING DIFFERENT COMMUNICATION SCHEMES

CROSS-REFERENCE TO RELATED APPLICATIONS

This application claims priority to Japanese Patent Application No. 2013-040086, filed on Feb. 28, 2013, the contents of which are hereby incorporated by reference into the present application.

TECHNICAL FIELD

The present specification discloses a function executing apparatus capable of executing a print function, and a terminal apparatus capable of communicating with the function executing apparatus.

DESCRIPTION OF RELATED ART

A telephone system provided with a plurality of wireless telephones and a telephone control apparatus is known. Upon detecting a channel number which a wireless LAN base station has started to use, the telephone control apparatus notifies the each wireless telephone of the channel number. The each wireless telephone uses the notified channel number.

SUMMARY

In the present specification, a technique is presented which may allow sending of print data from a terminal apparatus to a function executing apparatus to be executed appropriately.

One aspect disclosed in the present specification may be a terminal apparatus. The terminal apparatus may comprise: a processor, and a memory storing computer-readable instructions therein. The computer-readable instructions, when executed by the processor, may cause the terminal apparatus to perform: receiving first information relating to a first function executing apparatus from the first function executing apparatus, the first function executing apparatus being configured to execute a print function; selecting, by using the first information, a particular communication scheme from among M1 items of communication schemes in a case where the first information is received, the M1 being an integer of two or more, each of the M1 items of communication schemes being different from each other and being a communication scheme available for the first function executing apparatus to receive print data; and sending first print data to the first function executing apparatus in accordance with the particular communication scheme in a case where the particular communication scheme is selected from among the M1 items of communication schemes.

One aspect disclosed in the present specification is a function executing apparatus configured to execute a print function. The function executing apparatus may comprise: a processor, and a memory storing computer-readable instructions therein. The computer-readable instructions, when executed by the processor, may cause the function executing apparatus to perform: selecting a particular communication scheme from among M1 items of communication schemes, the M1 being an integer of two or more, each of the M1 items of communication schemes being different from each other and being a communication scheme available for the function executing apparatus to receive print data; sending a selection result indicating the particular communication scheme to a terminal apparatus; and receiving particular print data from the terminal apparatus in accordance with the particular communication scheme.

Moreover, a control method, a computer program, and a non-transitory computer-readable recording medium that stores the computer program, all for realizing the terminal apparatus and the function executing apparatus respectively, are also novel and useful. Further, a communication system comprising the terminal apparatus and the function executing apparatus is also novel and useful.

BRIEF DESCRIPTION OF THE DRAWINGS

FIG. 23 shows a sequence view of processes executed by devices of the fourth embodiment.
FIG. 24 shows a flowchart of a DP function confirmation process of a fifth embodiment.
FIG. 25 shows a sequence view of processes executed by devices of the fifth embodiment.

EMBODIMENT

First Embodiment

Structure of Communication System 2

Figure 1:
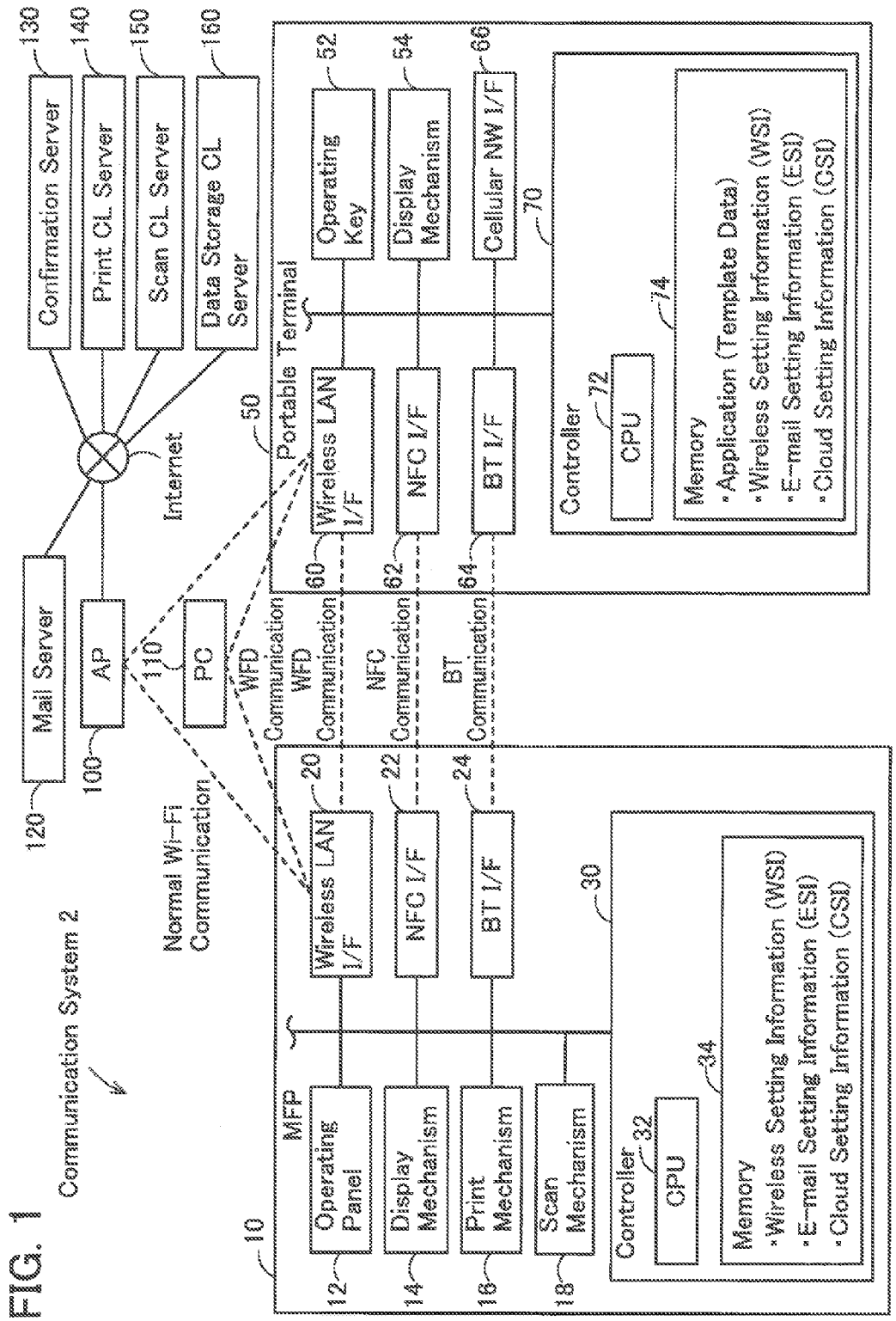
FIG. 1 shows the structure of a communication system.

As shown in FIG. 1, a communication system 2 comprises a multi-function peripheral (called "MFP (abbreviation of Multi-Function Peripheral)" below) 10, a portable terminal 50, an access point (called "AP (abbreviation of Access Point)" below) 100, a PC (abbreviation of Personal Computer) 110, a mail server 120, a confirmation server 130, a print CL server 140, a scan CL server 150, and a data storage CL server 160.

Structure of MFP 10

The MFP 10 is a peripheral device (e.g., a peripheral device of the PC 110) capable of executing multiple functions including a print function and a scan function. The MFP 10 comprises an operating panel 12, a display mechanism 14, a print mechanism 16, a scan mechanism 18, a wireless LAN (abbreviation of Local Area Network) interface 20, an NFC (abbreviation of Near Field Communication) interface 22, a BT (abbreviation of Blue Tooth (registered trademark)) interface 24, and a controller 30. The units 12 to 30 are connected with a bus line (reference number omitted). Below, interface is referred to as "I/F".

The operating panel 12 comprises a plurality of keys. A user can give various instructions to the MFP 10 by operating the operating panel 12. The display mechanism 14 is a display for showing various types of information. The print mechanism 16 is a print mechanism such as an ink jet method, laser method. The scan mechanism 18 is a scan mechanism such as a CCD or CIS.

The wireless LAN I/F 20 is an interface for executing a wireless communication, and is physically one interface (i.e., one IC chip). However, a MAC address (called "WFD MAC" below) used in wireless communication (called "WFD communication" below) according to a WFD (abbreviation of Wi-Fi Direct) scheme, and a MAC address (called "normal Wi-Fi MAC" below) used in wireless communication (called "normal Wi-Fi communication" below) according to a normal Wi-Fi scheme both be assigned to the wireless LAN I/F 20.

Specifically, a normal Wi-Fi MAC is assigned in advance to the wireless LAN I/F 20. By using the normal Wi-Fi MAC, the controller 30 generates a WFD MAC which is different from the normal Wi-Fi MAC, and assigns the WFD MAC to the wireless LAN I/F 20. Consequently, the controller 30 can simultaneously execute both a normal Wi-Fi communication using the normal Wi-Fi MAC, and a WFD communication using the WFD MAC. The WFD communication and the normal Wi-Fi communication will be described in detail later.

The NFC I/F 22 is an interface for executing NFC communication. NFC communication is a wireless communication according to an NFC scheme for so-called short distance wireless communication. The NFC scheme is a wireless communication scheme based on e.g., international standards ISO/IEC21481 or 18092.

The BT I/F 24 is an interface for executing BT communication. BT communication is a wireless communication according to a BT scheme for a so-called short distance wireless communication. The BT scheme is a wireless communication scheme based on e.g., standard IEEE802.15.1. A chip configuring the wireless LAN I/F 20, a chip configuring the NFC I/F 22, and a chip configuring the BT I/F 24 are physically different. Moreover, in the present embodiment, each of the three I/Fs are configured as different chips. However, in a variant, the wireless LAN I/F 20, the NFC I/F 22, and the BT I/F 24 may be configured as one chip, or two of the three I/Fs may be configured as one chip.

A communication speed (e.g., maximum communication speed is 11 to 600 Mbps) of a wireless communication (i.e., normal Wi-Fi communication and WFD communication) using the wireless LAN I/F 20 is faster than a communication speed (e.g., maximum communication speed is 24 Mbps) of a wireless communication via the BT I/F 24 (i.e., BT communication). The communication speed of a wireless communication via the BT I/F 24 (i.e., BT communication) is faster than a communication speed (e.g., maximum communication speed is 100 to 424 Kbps) using the NFC I/F 22. That is, the communication speed of the wireless communication is fastest for the wireless LAN I/F 20, second fastest for the BT I/F 24, and slowest for the NFC I/F 22.

Frequency of a carrier wave in a wireless communication via the wireless LAN I/F 20 is, e.g., 2.40 Hz band or 5.0 GHz band. Frequency of a carrier wave in a wireless communication via the NFC I/F 22 is, e.g., 13.56 MHz band. Frequency of a carrier wave in a wireless communication via the BT I/F 24 is, e.g., 2.4 GHz band. That is, the frequency of the carrier wave is different for the wireless LAN I/F 20 and the NFC I/F 22, and is different for the NFC I/F 22 and the BT I/F 24. Further, in a case where the frequency of the carrier wave of the wireless LAN I/F 20 is 5.0 GHz band, the frequency of the carrier wave differs between the wireless LAN I/F 20 and the BT I/F 24.

A maximum distance (e.g., approximately 100 m) across which the MFP 10 can execute a wireless communication with a communication destination device (e.g., the portable terminal 50) via the wireless LAN I/F 20 is greater than a maximum distance (e.g., approximately several tens of meters) across which the MFP 10 can execute a wireless communication with a communication destination device (e.g., the portable terminal 50) via the BT I/F 24. Further, a maximum distance (e.g., approximately several tens of meters) across which the MFP 10 can execute a wireless communication with a communication destination device (e.g., the portable terminal 50) via the BT I/F 24 is greater than a maximum distance (e.g., approximately 10 cm) across which the MFP 10 can execute a wireless communication with a communication destination device via the NFC I/F 22. That is, the communicable range of the wireless communication is greatest for the wireless LAN I/F 20, second greatest for the BT I/F 24, and smallest for the NFC I/F 22.

The controller 30 comprises a CPU 32 and a memory 34. The CPU 32 executes various processes according to a program stored in the memory 34. Further, the memory 34 can store wireless setting information (called "WSI (abbreviation of Wireless Setting Information)" below) for the MFP 10 to execute various types of communication (i.e., WFD communication, normal Wi-Fi communication, BT communication), E-mail setting information (called "ESI (abbreviation of E-mail Setting Information)" below) for the MFP 10 to execute E-mail (abbreviation of Electronic Mail) communication, and cloud setting information (called "CSI (abbreviation of Cloud Setting Information)" below) for the MFP 10 to execute communication with a cloud server (called "cloud communication" below). Moreover, the E-mail communication or cloud communication may be executed via the wireless LAN I/F 20, or may be executed via another I/F, which is not shown (e.g., a wired LAN I/F, etc.).

Structure of Portable Terminal 50

The portable terminal 50 is a portable terminal apparatus such as a mobile phone (e.g., a Smart Phone), PDA, notebook PC, tablet PC, portable music playback device, portable video playback device, etc. The portable terminal 50 comprises an operating key 52, a display mechanism 54, a wireless LAN I/F 60, an NFC I/F 62, a BT I/F 64, a cellular NW (abbreviation of Network) I/F 66, and a controller 70. The units 52 to 70 are connected to a bus line (reference number omitted).

The user can give various instructions to the portable terminal 50 by operating the operating key 52. The display mechanism 54 is a display for displaying various types of information. The I/Fs 60, 62, 64 are the same as the I/Fs 20, 22, 24 of the MFP 10. Consequently, the differences between the I/Fs 60, 62, 64 are the same as the differences between the I/Fs 20, 22, 24.

The cellular NW I/F 66 is an interface for executing cellular communication. Cellular communication is a wireless communication according to a cellular scheme. The cellular scheme is a wireless communication scheme based on, e.g., International Standards for IMT (abbreviation of International Mobile Telecommunication) 2000, and is a so-called 3G, 4G, etc. wireless communication scheme.

The controller 70 comprises a CPU 72 and a memory 74. The CPU 72 executes various processes according to a program stored in the memory 74. The memory 74 stores an application (called "MFP application" below) for causing the MFP 10 to execute a function (e.g., print function, scan function, etc.). The MFP application may, e.g., be installed on the portable terminal 50 from a server provided by a vendor of the MFP 10, or may be installed on the portable terminal 50 from a media shipped together with the MFP 10.

Further, the memory 74 can store WSI for the portable terminal 50 to execute various types of communication (WFD communication, normal Wi-Fi communication, BT communication), ESI for the portable terminal 50 to execute E-mail communication, and CSI for the portable terminal 50 to execute cloud communication. Moreover, the E-mail communication or the cloud communication may be executed via the wireless LAN I/F 60, or may be executed via a wireless LAN I/F 60, or via a cellular network I/F 66.

Structure of Other Apparatuses 100 to 160

The AP 100 is a standard access point called a wireless access point, wireless LAN router, etc., and is different from a WFD scheme G/O device (to be described). The AP 100 can form a normal Wi-Fi network (to be described). The AP 100 comprises a router function that is connected to the Internet and that relays communication between the Internet and the normal Wi-Fi network formed by the AP 100. Moreover, below, a network may be described as "NW".

The PC 110 is a known computer that operates according to an OS program. The PC 110 can execute a WFD communication according to the WFD scheme.

The servers 120 to 160 are connected with the Internet. The mail server 120 includes an SMTP (abbreviation of Simple Mail Transfer Protocol) server, and a POP (abbreviation of Post Office Protocol) server. The mail server 120 relays the communication of electronic mail in a case where sending of electronic mail from one communication device (e.g., the portable terminal 50) to another communication device (e.g., the MFP 10) is to be executed.

The confirmation server 130, the print CL (abbreviation of Cloud) server 140, and the scan CL server 150 are each servers provided by e.g., the vendor of the MFP 10. The confirmation server 130 sends a response signal to the MFP 10 in case of receiving a signal from the MFP 10. Further, in case of receiving a signal from the portable terminal 50, the confirmation server 130 sends a response signal to the portable terminal 50. In a case where sending of print data from a communication device (e.g., the portable terminal 50) to the MFP 10 is to be executed, the print CL server 140 relays the communication of the print data. The scan CL server 150, in a case where sending of scan data from the MFP 10 to a communication device (e.g., the portable terminal 50) is to be executed, relays the communication of the scan data.

The data storage CL server 160 is a known server such as, e.g., FACEBOOK (registered trademark), GOOGLE DOCS (registered trademark), PICASA (registered trademark), etc. The data storage CL server 160 receives scan data from the MFP 10, and stores the scan data.

Figure 2:
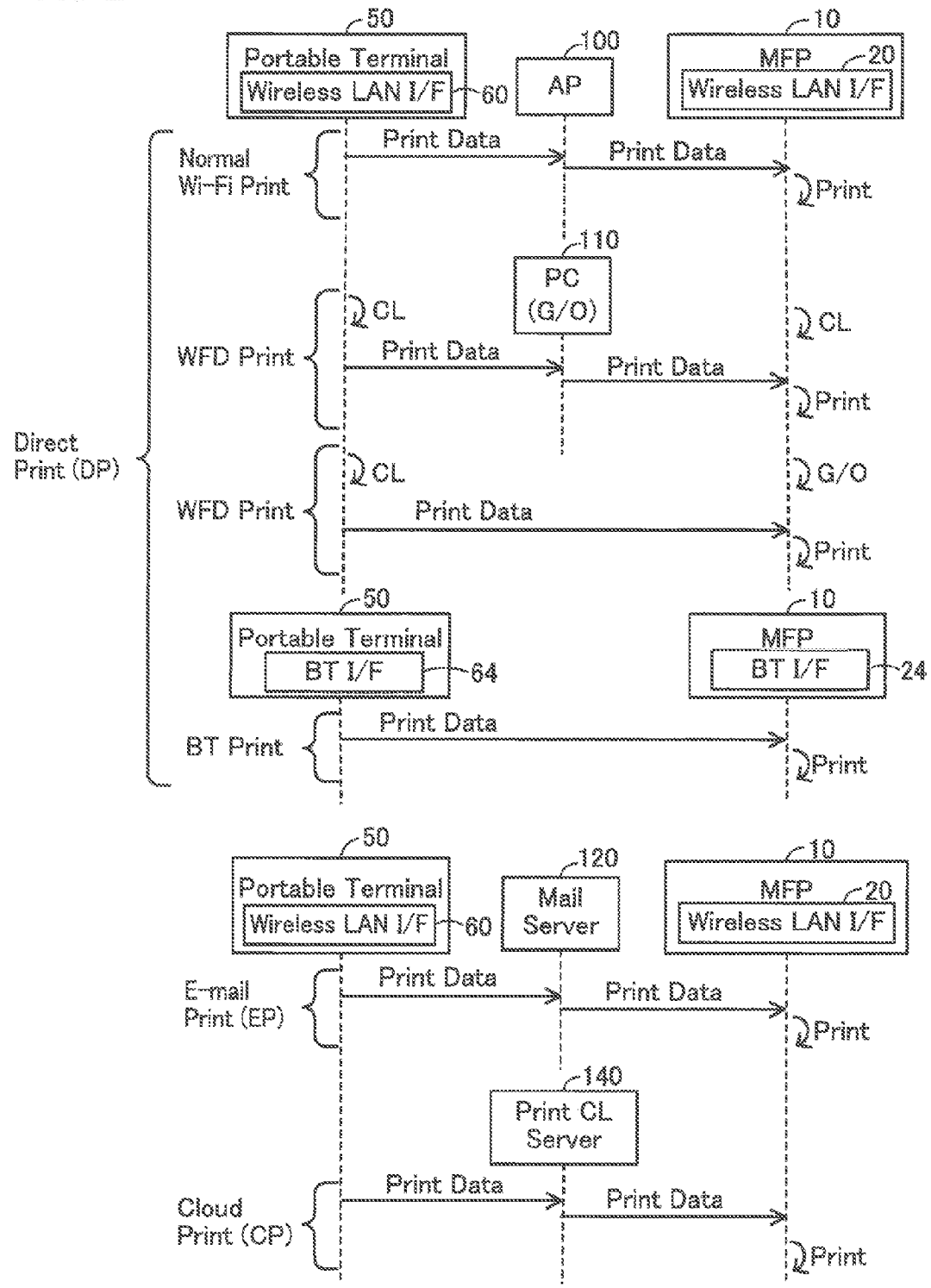
FIG. 2 shows a view for describing a print function which an MFP is capable of executing.

Print Function which MFP 10 is Capable of Executing; FIG. 2

Next, print functions which the MFP 10 is capable of executing will be described with reference to FIG. 2. The print functions are classified into direct print (called "DP" below), E-mail print (called "EP" below), and cloud print (called "CP" below).

DP

In DP, the sending of print data from the portable terminal 50 to the MFP 10 is executed not via the Internet. DP is classified into normal Wi-Fi print, WFD print, and BT print.

Normal Wi-Fi Print

In normal Wi-Fi print, the communication of print data is executed by using a normal Wi-Fi NW formed in accordance with a normal Wi-Fi scheme. The normal Wi-Fi scheme is a wireless communication scheme defined by Wi-Fi Alliance, and is a wireless communication scheme for executing a wireless communication via the AP 100.

FIG. 2 shows a normal Wi-Fi NW that includes the MFP 10, the portable terminal 50, and the AP 100. In a state where this type of normal Wi-Fi NW has been formed, the wireless LAN I/F 20 of the MFP 10 can receive print data from the wireless LAN I/F 60 of the portable terminal 50, via the AP 100, by using the normal Wi-Fi NW.

The MFP 10 and the portable terminal 50 each store WSI for belonging to the normal Wi-Fi NW (i.e., WSI for executing a normal Wi-Fi communication (called "normal Wi-Fi WSI" below)). The normal Wi-Fi WSI includes an SSID, BSSID, authentication scheme, encryption scheme, password, etc. The SSID is identification information for identifying the normal Wi-Fi NW, and is generated by the AP 100. The BSSID is identification information for identifying the AP 100 (i.e., a MAC address of the AP 100). The normal Wi-Fi WSI of the MFP 10 further includes an IP address of the MFP 10, and the normal Wi-Fi WSI of the portable terminal 50 further includes an IP address of the portable terminal 50. Moreover, in normal Wi-Fi print, the MFP 10 and the portable terminal 50 execute the communication of print data by using, e.g., a communication protocol such as LPR (abbreviation of Line PRinter daemon protocol).

WFD Print

In WFD print, the communication of print data is executed by using a WFD NW formed in accordance with a WFD scheme. The WFD scheme is a wireless communication scheme described in the standard document "Wi-Fi Peer-to-Peer (P2P) Technical Specification Version 1.1", created by Wi-Fi Alliance.

Below, an apparatus capable of executing an operation in accordance with the WFD scheme, such as the MFP 10, the portable terminal 50, etc. is called a "WFD-compatible device". In the WFD standard document, three states are defined as the states of the WFD-compatible device: Group Owner state (called "G/O state" below), client state (called "CL state" below), and device state. The WFD-compatible device is capable of selectively operating in one state among the three states.

When a pair of WFD-compatible devices that are in the device state are to newly form a wireless network, the pair of WFD-compatible devices usually execute a wireless communication called G/O negotiation. In the G/O negotiation, it is determined that one of the pair of WFD-compatible devices will assume the G/O state (i.e., become a G/O device), and that the other of the pair of WFD-compatible devices will assume the CL state (i.e., become a CL device). Then the pair of WFD-compatible devices establishes a connection and forms the wireless network.

Below, a wireless network formed in accordance with a procedure (e.g., G/O negotiation) of the WFD scheme is called a "WFD NW". At a stage where the WFD NW has been newly formed by means of G/O negotiation, only one G/O device and one CL device belong to the WFD NW. However, the G/O device can establish a connection with another device, and cause the other device to newly participate in the WFD NW as a CL device. In this case, a state is formed in which two or more CL devices belong to the WFD NW. That is, one G/O device and one or more CL devices can be present in the WFD NW. The G/O device manages the one or more CL devices. Specifically, the G/O device registers the MAC address of each of the one or more CL devices in a management list in the memory of the G/O device. The G/O device is capable of executing, not via another device, a wireless communication of target data with the CL device registered in the management list. Further, the G/O device is capable of relaying a wireless communication of target data (e.g., print data, scan data, etc.) between the plurality of CL devices. In other words, the pair of CL devices are capable of executing a wireless communication of the target data via the G/O device.

FIG. 2 shows an example of the WFD NW in which the PC 110 is a G/O device, and the portable terminal 50 and the MFP 10 are CL devices. In a state where this type of WFD NW has been formed, the wireless LAN I/F 20 of the MFP 10, which is a CL device, can use the WFD NW to receive print data via the PC 110, which is a G/O device, from the wireless LAN I/F 60 of the portable terminal 50, which is a CL device.

FIG. 2 further shows an example of the WFD NW in which the MFP 10 is a G/O device and the portable terminal 50 is a CL device. In a state where this type of WFD NW has been formed, the wireless LAN I/F 20 of the MFP 10, which is a G/O device, can use the WFD NW to receive print data from the wireless LAN I/F 60 of the portable terminal 50, which is a CL device, not via another device.

The MFP 10 and the portable terminal 50 each store WSI for belonging to the WFD NW (i.e., WSI for executing WFD communication (called "WFD WSI" below)). The WFD WSI includes an SSID, BSSID, authentication scheme, encryption scheme, password, etc. The SSID is identification information for identifying the WFD NW, and is generated by the G/O device. The BSSID is identification information for identifying the G/O device (i.e., a MAC address of the G/O device). The WFD WSI of the MFP 10 further includes the IP address of the MFP 10, and the WFD WSI of the portable terminal 50 further includes the IP address of the portable terminal 50. Moreover, in WFD print, the MFP 10 and the portable terminal 50 execute the communication of print data by using a communication protocol such as LPR.

BT Print

In BT print, the communication of print data is executed by using a BT NW formed in accordance with the BT scheme. FIG. 2 shows a BT NW that includes the MFP 10 and the portable terminal 50. In a state where this type of the BT NW has been formed, the BT I/F 24 of the MFP 10 can use the BT NW to receive print data from the BT I/F 64 of the portable terminal 50, not via another device.

The MFP 10 and the portable terminal 50 each store WSI for belonging to the BT NW (i.e., WSI for executing BT communication (called "BT WSI" below)). The BT WSI includes a PIN code (i.e., a pairing code). Moreover, in the BT print, the MFP 10 and the portable terminal 50 execute a communication of print data by using a communication protocol such as, e.g., BPP (abbreviation of Basic Printing Profile), BIP (abbreviation of Basic Imaging Profile), OPP (abbreviation of Object Push Profile), etc.

EP

In EP, the sending of print data (i.e., an E-mail communication) from the portable terminal 50 to the MFP 10 is executed via the Internet. As shown in FIG. 2, the wireless LAN I/F 20 of the MFP 10 can receive print data from the wireless LAN I/F 60 of the portable terminal 50 via the mail server 120.

In order to execute the E-mail communication of print data, the MFP 10 and the portable terminal 50 each store ESI. That is, the portable terminal 50 stores at least sending ESI (i.e., SMTP setting information) for sending E-mail. Further, the MFP 10 stores at least receiving ESI (i.e., POP setting information) for receiving E-mail.

The SMTP setting information includes a URL (abbreviation of Uniform Resource Locator) of an SMTP server, user name, password, etc. The POP setting information includes a URL of a POP server, user name, password, etc. In the present embodiment, the SMTP server and the POP server are shown as the one mail server 120 but, in a variant, may be configured separately. In EP, the MFP 10 and the portable terminal 50 execute communication of print data by using the SMTP and POP communication protocols.

CP

In CP, the sending of print data (i.e., cloud communication) from the portable terminal 50 to the MFP 10 is executed via the Internet. As shown in FIG. 2, the wireless LAN I/F 20 of the MFP 10 can receive print data from the wireless LAN I/F 60 of the portable terminal 50 via the print CL server 140.

In order to execute the cloud communication of print data, the MFP 10 and the portable terminal 50 each store printing CSI. The printing CSI includes a URL (abbreviation of Uniform Resource Locator) of the print CL server 140, account information, authentication information (e.g., an access token), etc. In CP, the MFP 10 and the portable terminal 50 execute a communication of print data by using a communication protocol such as HTTP (abbreviation of Hyper Text Transfer Protocol).

Above DP, EP, CP are each print functions which the MFP 10 is capable of executing but, in other words, mean communication schemes for the MFP 10 to receive print data. That is, DP means a communication scheme which is a direct scheme (i.e., the normal Wi-Fi scheme, the WFD scheme, and the BT scheme). EP, CP mean communication schemes which are an E-mail scheme and a cloud scheme, respectively. That is, the MFP 10 can receive print data by using any of three communication schemes, namely direct scheme, E-mail scheme, and cloud scheme.

Figure 3:
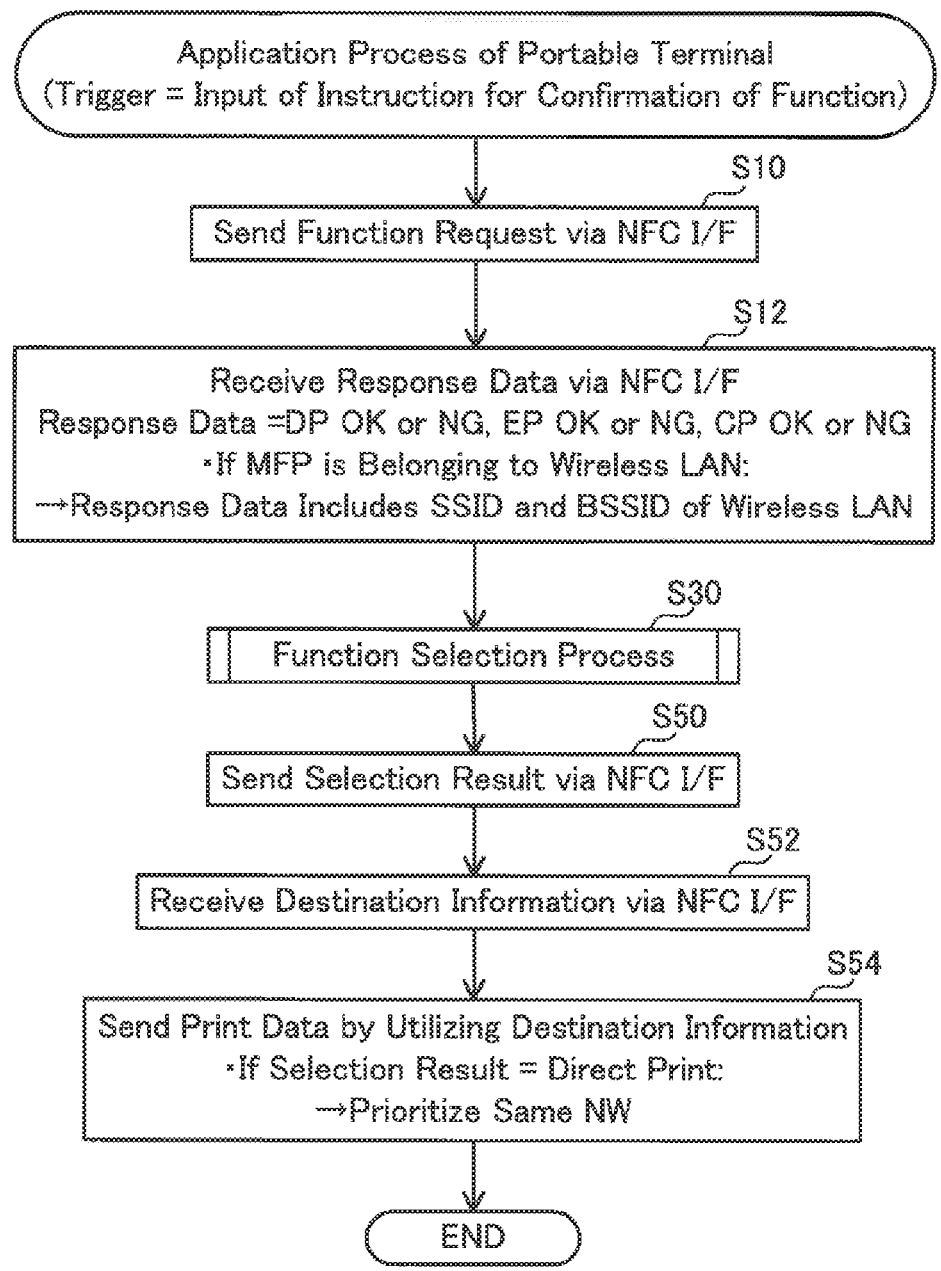
FIG. 3 shows a flowchart of an application process of a portable terminal of a first embodiment.

Application Process of Portable Terminal 50; FIG. 3

Next, the contents of a process realized by the MFP application installed on the portable terminal 50 will be described with reference to FIG. 3. In case of wanting to cause the MFP 10 to execute a print, the user of the portable terminal 50 operates the operating key 52, activating the MFP application. Next, in order to establish an NFC connection between the MFP 10 and the portable terminal 50, the user brings the portable terminal 50 closer to the MFP 10.

When the distance between the portable terminal 50 and the MFP 10 becomes less than a distance (e.g., 10 cm) across which NFC communication can be executed, an NFC connection is established between the MFP 10 and the portable terminal 50. In this case, in S10, the CPU 72 sends a function request to the MFP 10 via the NFC I/F 62 by using the above NFC connection. The function request is a request to cause response data (to be described) to be sent to the MFP 10 (see S100, S102 of FIG. 7).

In S12, the CPU 72 receives the response data from the MFP 10 via the NFC I/F 62 by using the NFC connection. In a case where the MFP 10 is capable of executing DP, the response data includes information indicating DP OK, and in a case where the MFP is not capable of executing DP, the response data includes information indicating DP NG. In a case where the MFP 10 is capable of executing EP, the response data includes information indicating EP OK, and in a case where the MFP is not capable of executing EP, the response data includes information indicating EP NG. In a case where the MFP 10 is capable of executing CP, the response data includes information indicating CP OK, and in a case where the MFP is not capable of executing CP, the response data includes information indicating CP NG. In a case where the MFP 10 is belonging to a wireless LAN (normal Wi-Fi NW or WFD NW), the response data further includes the SSID and BSSID of that wireless LAN.

In S30, the CPU 72 executes a function selection process. As will be described in detail later, in the function selection process (FIG. 4 to FIG. 6), the CPU 72 selects one communication scheme from among the one or more communication schemes (DP, EP, CP) which the MFP 10 is capable of executing.

Next, in S50, the CPU 72 sends the selection result (i.e., DP, EP, or CP) of the function selection process of S30 to the MFP 10 via the NFC I/F 62 by using the NFC connection.

Next, in S52, the CPU 72 receives destination information from the MFP 10 via the NFC I/F 62 by using the NFC connection. The destination information indicates a destination for executing the sending of print data from the portable terminal 50 to the MFP 10 in accordance with the communication scheme corresponding to the selection result of the function selection process of S30. As will be described in detail later, in the case where the selection result is EP, the destination information includes an E-mail address of the MFP 10 (see S119 of FIG. 11). Further, in the case where the selection result is CP, the destination information includes the printing CSI (i.e., the URL of the print CL server 140, etc.) that is being stored in the memory 34 of the MFP 10 (see S120 of FIG. 11).

Figure 11:
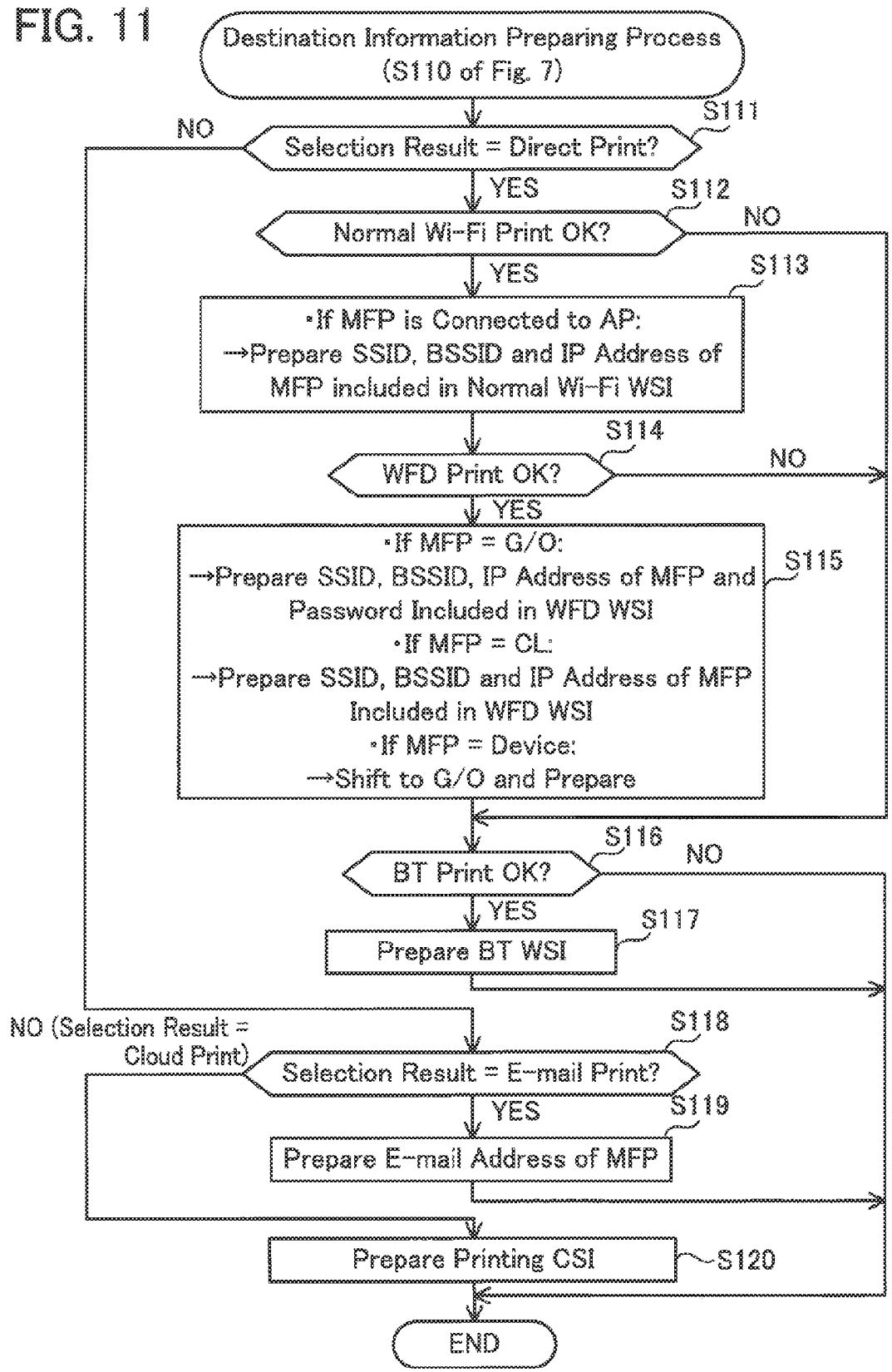
FIG. 11 shows a flowchart of a destination information preparing process of the first embodiment.

Further, in the case where the selection result is DP, the destination information includes information relating to at least one WSI among the WSIs (i.e., the normal Wi-Fi WSI, the WFD WSI, and the BT WSI) that are being stored in the memory 34 of the MFP 10 (see S113, S115, S117 of FIG. 11). More specifically, in the case where the MFP 10 is capable of executing normal Wi-Fi print, the destination information includes the information (normal Wi-Fi SSID, normal Wi-Fi BSSID, and normal Wi-Fi IP address of the MFP 10) included in the normal Wi-Fi WSI of the MFP 10 (see S113 of FIG. 11). Further, in the case where the MFP 10 is capable of executing WFD print, the destination information includes the information (WFD SSID, WFD BSSID, and WFD IP address of the MFP 10) included in the WFD WSI of the MFP 10 (see S115 of FIG. 11). Moreover, in a case where the MFP 10 is a G/O device, the destination information further includes the password included in the WFD WSI of the MFP 10. However, in a case where the MFP 10 is a CL device, the destination information does not include the password included in the WFD WSI of the MFP 10. In the case where the MFP 10 is capable of executing BT print, the destination information includes the BT WSI (i.e., PIN code) of the MFP 10 (see S117 of FIG. 11).

Thus, in the present embodiment, the CPU 72 executes two round trips of communication, these including one round trip of communication which is sending a function request (S10) and receiving response data such as DP OK, etc. (S12), and one round trip of communication which is sending a selection result (S50) and receiving destination information (S52). That is, the CPU 72 executes two round trips of communication in one session of a NFC connection. Upon ending S52, the NFC connection is disconnected.

Next, in S54, the CPU 72 sends print data to the MFP 10 by using the destination information received in S52, in accordance with the communication scheme corresponding to the selection result of the function selection process of S30.

Specifically, e.g., in the case where the selection result is EP, the CPU 72 generates an E-mail in which the mail address of the MFP 10 included in the destination information is designated as the destination address, and attaches the print data (i.e., print target data designated by the user) to the E-mail. Then, the CPU 72 sends the E-mail via the wireless LAN I/F 60, or via the cellular NW I/F 66.

In the case where the portable terminal 50 is belonging to a wireless LAN (i.e., a normal Wi-Fi NW or a WFD NW), the CPU 72 sends the E-mail via the wireless LAN I/F 60. According to this, the portable terminal 50 can send the print data to the MFP 10 via the wireless LAN and the internet (i.e., the mail server 120) (see EP of FIG. 2). Further, in a case where the portable terminal 50 is belonging to a cellular NW, the CPU 72 sends the E-mail via the cellular NW I/F 66. According to this, the portable terminal 50 can send the print data to the MFP 10 via the cellular NW and the internet (i.e., the mail server 120) (see EP of FIG. 2).

Further, in a case where the portable terminal 50 is belonging to both a wireless LAN and a cellular NW, the CPU 72 sends the E-mail via the wireless LAN I/F 60. That is, the CPU 72 prioritizes use of the wireless LAN to send the E-mail. The reason is as follows. That is, cellular communication using a cellular NW may be subject to being charged for at a metered rate in accordance with the data size of communication data, whereas a normal Wi-Fi communication (or WFD communication) using a wireless LAN is normally not subject to being charged for at a metered rate. Consequently, the CPU 72 prioritizes use of the wireless LAN to send the E-mail.

Further, e.g., in the case where the selection result is CP, the CPU 72 connects to the print CL server 140 via the wireless LAN I/F 60 or the cellular NW I/F 66 by using the printing CSI included in the destination information. Next, the CPU 72 generates a command in which the URL of the print CL server 140 included in the printing CSI is designated as the destination, and attaches the print data to the command. Then, the CPU 72 sends the command including the print data via the wireless LAN I/F 60 or the cellular NW I/F 66. Moreover, which I/F to use, of the wireless LAN I/F 60 and the cellular NW I/F 66, is the same as the case of EP. The portable terminal 50 can send the print data to the MFP 10 via the wireless LAN or cellular NW, and the internet (i.e., the print CL server 140) (see CP of FIG. 2).

Further, e.g., in the case where the selection result is DP, the CPU 72 first determines whether the MFP 10 and the portable terminal 50 are belonging to the same NW by using the destination information. For example, in a case where a set of normal Wi-Fi SSID and normal Wi-Fi BSSID of the MFP 10 and a set of normal Wi-Fi SSID and normal Wi-Fi BSSID of the portable terminal 50 are identical, the CPU 72 determines that the MFP 10 and the portable terminal 50 are belonging to the same normal Wi-Fi NW. Further, e.g., in a case where a set of WFD SSID and WFD BSSID of the MFP 10 and a set of WFD SSID and WFD BSSID of the portable terminal 50 are identical, the CPU 72 determines that the MFP 10 and the portable terminal 50 are belonging to the same WFD NW. Further, e.g., in a case where a PIN code included in the BT WSI of the MFP 10 and a PIN code included in the BT WSI of the portable terminal 50 are identical, the CPU 72 determines that the MFP 10 and the portable terminal 50 are belonging to the same BT NW.

Moreover, in the present embodiment, the CPU 72 determines whether the MFP 10 and the portable terminal 50 are belonging to the same NW (the normal Wi-Fi NW or the WFD NW) by determining whether the sets of SSID and BSSID are identical. However, in a variant, the CPU 72 may determine whether the MFP 10 and the portable terminal 50 are belonging to the same NW by determining only whether the SSIDs are identical, or by determining only whether the BSSIDs are identical.

In a case where the CPU 72 determines that the MFP 10 and the portable terminal 50 are belonging to the same NW, the CPU 72 sends print data to the MFP 10 by using that same NW. For example, in a case where the same NW is a normal Wi-Fi NW, the CPU 72 sends the print data via the wireless LAN I/F 60 with, as the destination, the normal Wi-Fi IP address of the MFP 10 included in the destination information. According to this, the portable terminal 50 can send the print data to the MFP 10 via the AP 100 (see normal Wi-Fi print of FIG. 2).

Further, e.g., in a case where the same NW is a WFD NW, the CPU 72 sends the print data via the wireless LAN I/F 60 with, as the destination, the WFD IP address of the MFP 10 included in the destination information. According to this, the portable terminal 50 can send print data to the MFP 10 via the PC 110, which is a G/O device, or not via another device (see WFD print of FIG. 2).

Further, e.g., in a case where the same NW is a BT NW, the CPU 72 sends the print data via the BT I/F 64 by using the PIN code included in the BT WSI of the MFP 10 (i.e., the BT WSI of the portable terminal 50). According to this, the portable terminal 50 can send the print data to the MFP 10 not via another device (see BT print of FIG. 2).

As described above, in S54, in the case where the selection result is DP, and the MFP 10 and the portable terminal 50 are belonging to the same NW, the portable terminal 50 sends the print data to the MFP 10 by prioritizing the same NW. According to this, the portable terminal 50 can quickly send the print data to the MFP 10 without needing to establish a wireless connection with the MFP 10.

Moreover, in a case where the MFP 10 and the portable terminal 50 are belonging to two or more same NWs, the CPU 72 prioritizes the NW having a faster communication speed. For example, in a case where the MFP 10 and the portable terminal 50 are belonging to the same WFD NW and to the same BT NW, the CPU 72 sends the print data to the MFP 10 by using the WFD NW.

Further, in a case where it is determined that the MFP 10 and the portable terminal 50 are not belonging to the same NW, the CPU 72 executes the following process. As described above, the destination information does not include the password used in the normal Wi-Fi NW to which the MFP 10 is belonging (see S113 of FIG. 11). Consequently, the CPU 72 cannot cause the portable terminal 50 to participate in the normal Wi-Fi NW.

The destination information can include the information (WFD SSID, WFD BSSID, password, and WFD IP address of the MFP 10) used in the WFD NW in which the MFP 10 is the G/O device (see S115 of FIG. 11). In this case, the CPU 72, establishes a wireless connection with the MFP 10, which is a G/O device, by using this information. According to this, the CPU 72 can cause the portable terminal 50 to participate, as a CL device, in the WFD NW in which the MFP 10 is the G/O device. Then, the CPU 72 sends the print data via the wireless LAN I/F 60 with, as the destination, the WFD IP address of the MFP 10 included in the destination information. According to this, the portable terminal 50, which is a CL device, can use the WFD NW to send the print data to the MFP 10, which is a G/O device, not via another device.

Further, the destination information can include the BT WSI (i.e., PIN code) of the MFP 10 (see S117 of FIG. 11). In this case, the CPU 72 establishes a wireless connection with the MFP 10 by using the BT WSI. Then, the CPU 72 sends the print data via the BT I/F 64 by using the PIN code. According to this, the portable terminal 50 can use the BT NW to send the print data to the MFP 10 not via another device.

Moreover, in a case where the destination information includes both the information used in the WFD NW in which the MFP 10 is the G/O device, and the BT WSI of the MFP 10, the CPU 72 prioritizes use of the WFD NW, which has the higher communication speed, and causes the portable terminal 50 to participate as a CL device in the WFD NW in which the MFP 10 is the G/O device.

Figure 4:
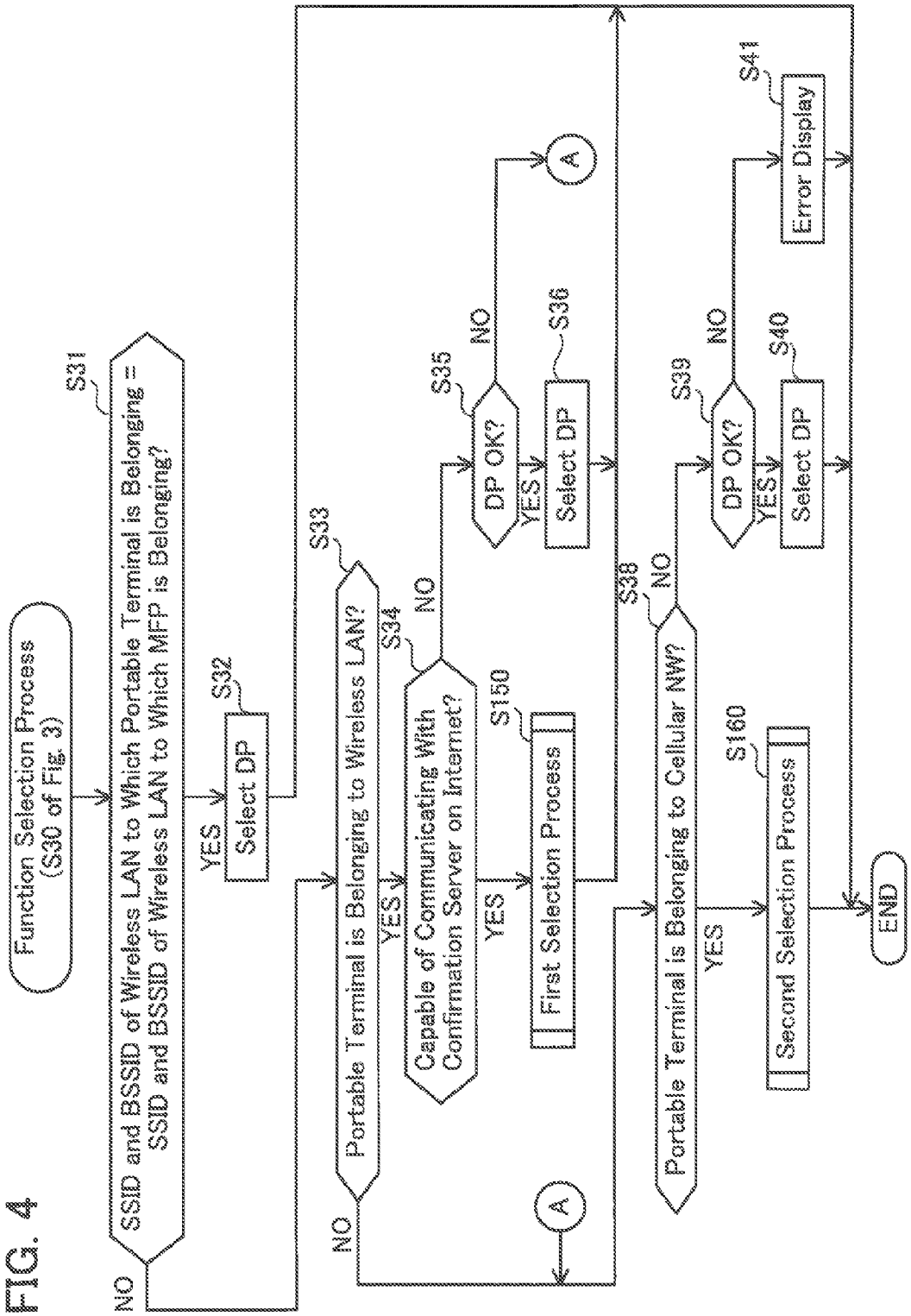
FIG. 4 shows a flowchart of a function selection process of the first embodiment.

Function Selection Process; FIG. 4

Next, the function selection process of S30 of FIG. 3 will be described with reference to FIG. 4. In S31, the CPU 72 determines whether the MFP 10 and the portable terminal 50 are belonging to the same normal Wi-Fi NW or the same WFD NW. In a case where neither the normal Wi-Fi WSI nor the WFD WSI of the portable terminal 50 is being stored in the memory 74, the CPU 72 determines NO in S31, and proceeds to S33.

In a case where the normal Wi-Fi WSI of the portable terminal 50 is being stored in the memory 74, the CPU 72 determines whether a set of SSID and BSSID (called "first set" below) which is identical to the set of normal Wi-Fi SSID and normal Wi-Fi BSSID included in the normal Wi-Fi WSI, is included in the response data. In a case where the first set is included in the response data, the CPU 72 determines YES in S31, and proceeds to S32, and in a case where the first set is not included in the response data, the CPU 72 determines NO in S31, and proceeds to S33.

Further, in a case where the WFD WSI of the portable terminal 50 is being stored in the memory 74, the CPU 72 determines whether a set of SSID and BSSID (called "second set" below) which is identical to the set of WFD SSID and WFD BSSID of that WFD WSI, is included in the response data. In a case where the second set is included in the response data, the CPU 72 determines YES in S31, and proceeds to S32, and in a case where the second set is not included in the response data, the CPU 72 determines NO in S31, and proceeds to S33.

As described above, in the case of determining YES in S31, the response data includes at least one of the first set and the second set. In this type of situation, since the MFP 10 is capable of executing at least one from among normal Wi-Fi print and WFD print (see S72, S75 of FIG. 8, to be described), the MFP 10 sends response data which includes DP OK to the portable terminal 50. Moreover, in this case, the response data includes OK or NG for each of EP and CP. In S32, the CPU 72 selects DP from among the one or more communication schemes (at least DP) indicating OK included in the response data, and ends the function selection process. In this case, since the MFP 10 and the portable terminal 50 are belonging to the same normal Wi-Fi NW or the same WFD NW, in S54 of FIG. 3 the CPU 72 can send the print data to the MFP 10 by using that same NW (i.e., in accordance with DP).

In S33, the CPU 72 determines whether the portable terminal 50 is belonging to a wireless LAN (i.e., a normal Wi-Fi NW, a WFD NW). In a case where at least one of the normal Wi-Fi WSI and the WFD WSI is being stored in the memory 74, the CPU 72 determines YES in S33, and proceeds to S34, and in a case where neither of the normal Wi-Fi WSI and the WFD WSI is being stored in the memory 74, the CPU 72 determines NO in S33, and proceeds to S38.

In S34, the CPU 72 determines whether the portable terminal 50 is capable of executing an internet communication via the wireless LAN. Specifically, the CPU 72 determines whether the portable terminal 50 is capable of communicating with the confirmation server 130 on the internet. That is, the CPU 72 sends a signal via the wireless LAN I/F 60, with the URL of the confirmation server 130 stored in advance in the memory 34 as the destination, and monitors whether a response signal is received from the confirmation server 130. In a case where a response signal from the confirmation server 130 is received, the CPU 72 determines YES in S34, and proceeds to S150. In this case, the portable terminal 50 is capable of executing internet communication via the wireless LAN. On the other hand, in a case where a response signal from the confirmation server 130 is not received, the CPU 72 determines NO in S34, and proceeds to S35.

Figure 5:
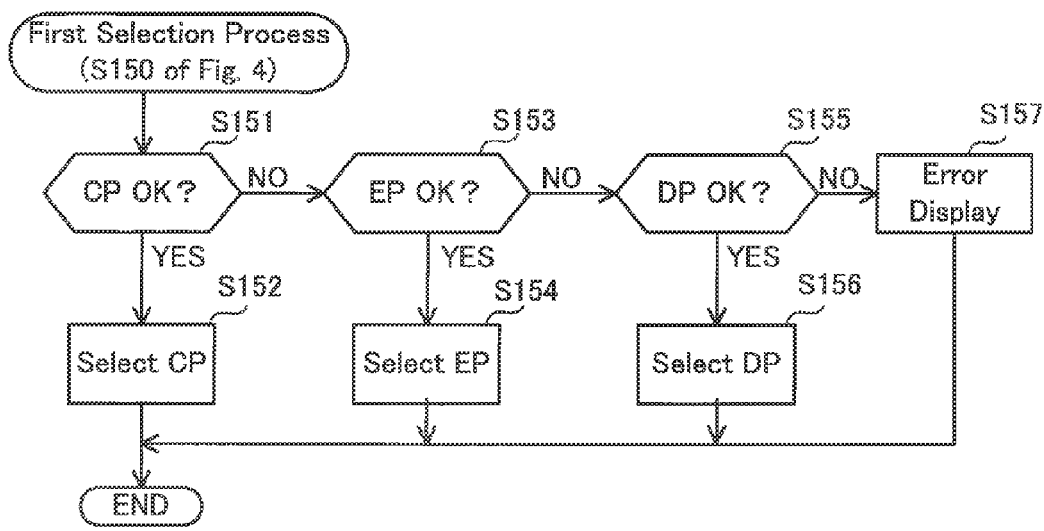
FIG. 5 shows a flowchart of a first selection process.

First Selection Process; FIG. 5

In S150, a first selection process (see FIG. 5) is executed by the CPU 72. In S151, the CPU 72 determines whether information indicating CP OK is included in the response data. In a case where information indicating CP OK is included in the response data, the CPU 72 determines YES in S151, selects CP in S152, and ends the first selection process.

In a case where information indicating CP NG is included in the response data, the CPU 72 determines NO in S151 and, in S153, determines whether information indicating EP OK is included in the response data. In a case where information indicating EP OK is included in the response data, the CPU 72 determines YES in S153, selects EP in S154, and ends the first selection process.

In a case where information indicating EP NG is included in the response data, the CPU 72 determines NO in S153 and, in S155, determines whether information indicating DP OK is included in the response data. In a case where information indicating DP OK is included in the response data, the CPU 72 determines YES in S155, selects DP in S156, and ends the first selection process.

On the other hand, in a case where information indicating DP NG is included in the response data, the CPU 72 determines NO in S155, in S157 causes the display mechanism 54 to display an error screen indicating that the MFP 10 cannot be caused to execute a print, and ends the first selection process. Moreover, in a case where S157 is executed, the processes from S50 of FIG. 3 onwards are not executed.

The first selection process is executed in the situation where the portable terminal 50 is belonging to a wireless LAN (i.e., a normal Wi-Fi NW, a WFD NW) (YES in S33 of FIG. 4). Then, priority in selecting the communication scheme is in the order CP, EP, DP (see FIG. 5). The reason for prioritizing CP and EP, in which the internet is used, over DP, which does not use the internet, is as follows.

Since the portable terminal 50 and the MFP 10 are not belonging to the same NW (NO in S31), the portable terminal 50 must execute a process to establish a wireless connection between the portable terminal 50 and the MFP 10 in order to use direct communication. By contrast, the portable terminal 50 does not need to establish the aforementioned wireless connection in order to use cloud communication or E-mail communication. Thus, from the viewpoint of reducing processing load, CP and EP are prioritized. Moreover, since the portable terminal 50 is belonging to the wireless LAN, in a case where CP or EP is selected, in S54 of FIG. 3 the portable terminal 50 sends the print data to the MFP 10 by using the wireless LAN which is not a cellular NW. Consequently, even if CP or EP is selected, the communication of print data is not subject to being charged for at a metered rate. Thus, from a cost viewpoint, prioritizing CP and EP is not a problem.

Moreover, prioritizing CP over EP is because, e.g., cloud communication may normally be better than E-mail communication in terms of security. Upon ending the first selection process, the CPU 72 ends the function selection process.

In S35 of FIG. 4, the CPU 72 determines whether information indicating DP OK is included in the response data. In a case where information indicating DP OK is included in the response data, the CPU 72 determines YES in S35, selects DP in S36, and ends the function selection process. In a case where the portable terminal 50 is belonging to a wireless LAN but is not capable of executing an internet communication via this wireless LAN (NO in S34), the portable terminal 50 is not capable of executing cloud communication and E-mail communication via this wireless LAN. Consequently, in S35 and S36, in a case where information indicating DP OK is included in the response data, the CPU 72 selects DP without selecting CP and EP. On the other hand, in a case where information indicating DP NG is included in the response data, the CPU 72 determines NO in S35, and proceeds to S38. However, in a variant, in a case where NO is determined in S34, S35 may be skipped, and processing may proceed to S38.

In S38, the CPU 72 determines whether the portable terminal 50 is belonging to a cellular NW. In a case where the portable terminal 50 is belonging to a cellular NW, the CPU 72 determines YES in S38, and proceeds to S160. On the other hand, in a case where the portable terminal 50 is not belonging to a cellular NW, the CPU 72 determines NO in S38, and proceeds to S39.

Figure 6:
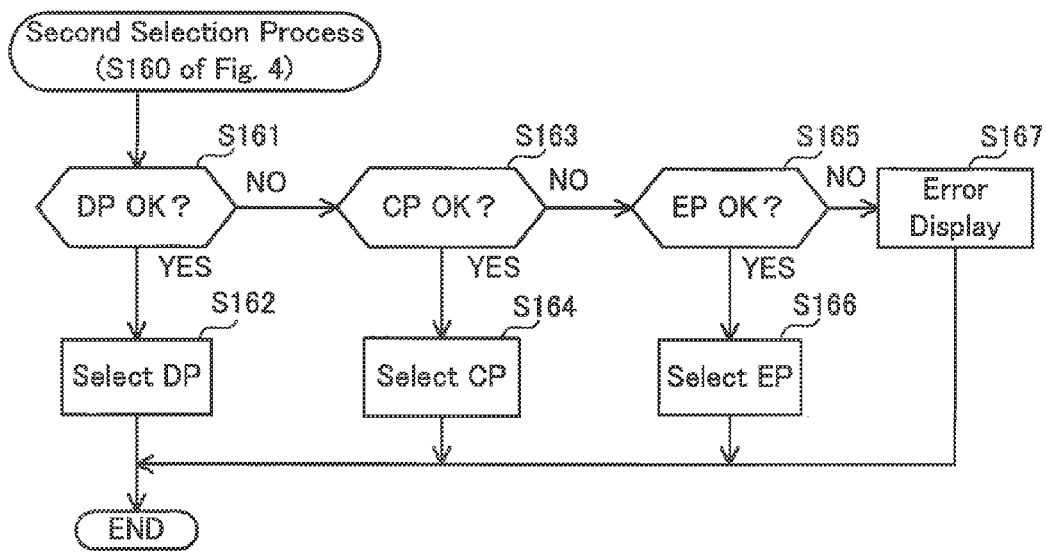
FIG. 6 shows a flowchart of a second selection process.

Second Selection Process; FIG. 6

In S160, the CPU 72 executes a second selection process (see FIG. 6). In the second selection process, the order of processes is different from the first selection process (FIG. 5). That is, in the first selection process, priority is in the order CP, EP, DP whereas, in the second selection process, priority is in the order DP, CP, EP. S161, 162 are the same as S155, 156 of FIG. 5. S163, 164 are the same as S151, 152 of FIG. 5, and S165, 166 are the same as S153, 154 of FIG. 5. S167 is the same as S157 of FIG. 5.

The second selection process is executed in the situation where the portable terminal 50 is belonging to a cellular NW (YES in S38 of FIG. 4) while in a state of the portable terminal 50 either not belonging to a wireless LAN (i.e., a normal Wi-Fi NW, a WFD NW) (NO in S33 of FIG. 4), or not being capable of executing an internet communication via a wireless LAN (NO in S34 of FIG. 4). Then, priority in selecting the communication scheme is in the order DP, CP, EP (see FIG. 6). The reason for prioritizing DP, in which the internet is not used, over CP and EP, in which the internet is used, is as follows.

Since the portable terminal 50 is not capable of executing an internet communication via a wireless LAN, and is belonging to a cellular NW, in a case where CP or EP is selected, the portable terminal 50 sends print data to the MFP 10 in S54 of FIG. 3 by using the cellular NW. Consequently, in the case where CP or EP is selected, the communication of print data may be subject to being charged for at a metered rate. By contrast, in a case where DP is selected, in S54 of FIG. 3 the portable terminal 50 newly establishes a wireless connection with the MFP 10, and sends print data to the MFP 10 by using the wireless LAN. In this case, since the cellular NW is not used, the communication of print data is not subject to being charged for at a metered rate. Thus, from the viewpoint of cost, DP is prioritized.

S39, S40 are the same as S35, 36 respectively. That is, since the portable terminal 50 is not capable of executing an internet communication via a wireless LAN or a cellular NW, in a case where information indicating DP OK is included in the response data, the CPU 72 selects DP without selecting CP and EP. However, in a case where information indicating DP NG is included in the response data, the CPU 72 determines NO in S39 and, in S41, causes the display mechanism 54 to display an error screen indicating that the MFP 10 cannot be caused to execute a print. Moreover, in a case where S41 is executed, the processes from S50 of FIG. 3 onwards are not executed.

Figure 7:
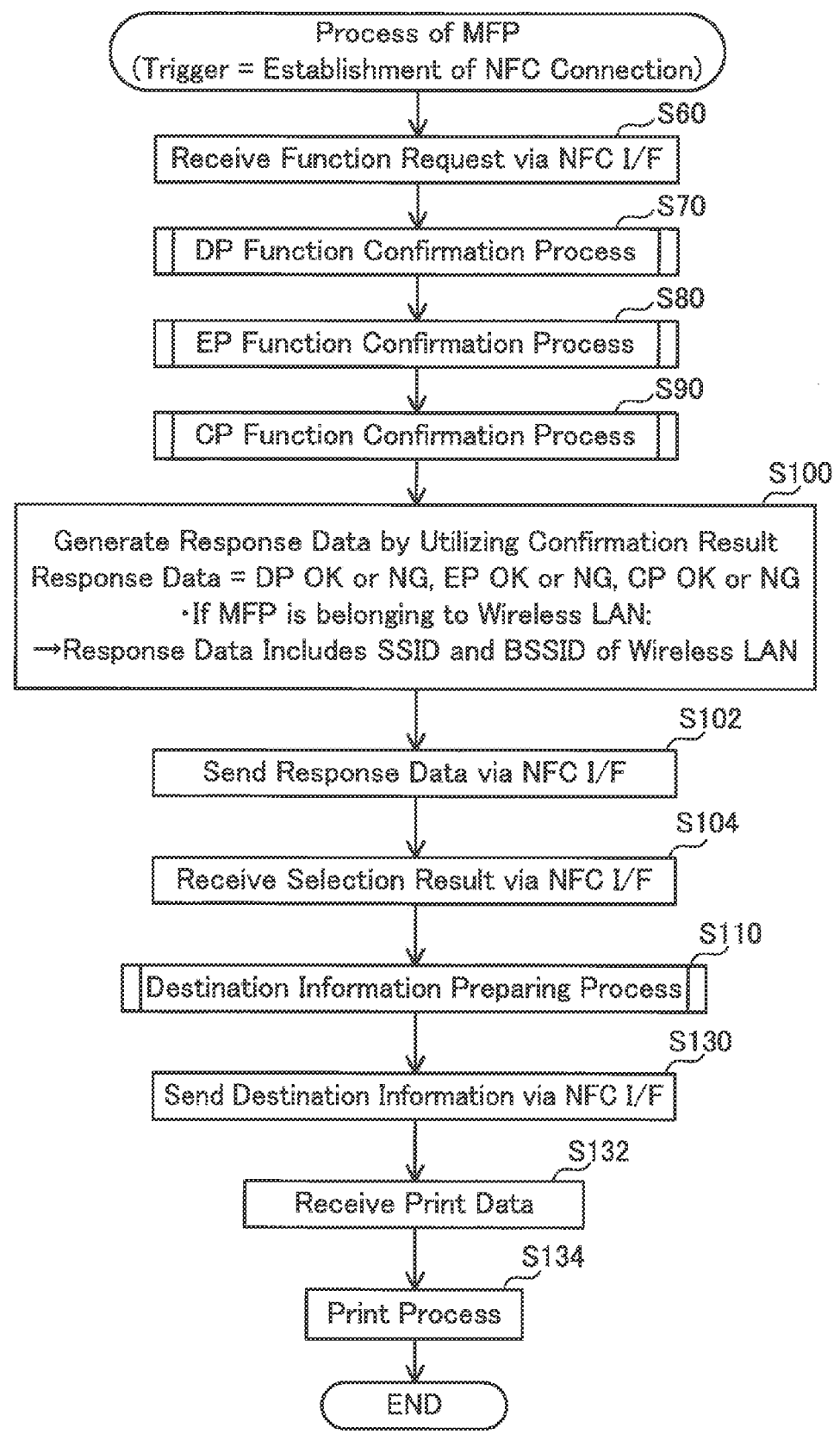
FIG. 7 shows a flowchart of a process of an MFP of the first embodiment.

Process of MFP 10; FIG. 7

Next, contents of a process executed by the MFP 10 will be described with reference to FIG. 7. A process of FIG. 7 is started with establishment of an NFC connection between the MFP 10 and the portable terminal 50 as a trigger.

In S60, the CPU 32 receives a function request from the portable terminal 50 via the NFC I/F 22 (see S10 of FIG. 3). Next, in S70, S80, S90, the CPU 32 executes a DP function confirmation process (see FIG. 8), an EP function confirmation process (see FIG. 9), and a CP function confirmation process (see FIG. 10). In these processes, the CPU 32 specifies the print function, among DP, EP, and CP, which the MFP 10 is capable of executing. These processes will be described in detail later.

Next, in S100, the CPU 32 generates response data by using a confirmation result of S70 to S90. As will be described in detail later, in S70, information indicating OK or NG is stored in the memory 34 for each of normal Wi-Fi print, WFD print, and BT print. In S100, in a case where information indicating OK is being stored in the memory 34 for at least one of normal Wi-Fi print, WFD print, and BT print, the CPU 32 generates response data which includes information indicating DP OK. Further, in a case where information indicating NG for all of normal Wi-Fi print, WFD print, and BT print is being stored in the memory 34, the CPU 32 generates response data which includes information indicating DP NG.

Further, as will be described in detail later, in S80, information indicating EP OK or EP NG is stored in the memory 34, and in S90, information indicating CP OK or CP NG is stored in the memory 34. In S100, in a case where information indicating EP OK (or CP OK) is being stored in the memory 34, the CPU 32 generates response data which includes information indicating EP OK (or CP OK) and, in a case where information indicating EP NG (or CP NG) is being stored in the memory 34, the CPU 32 generates response data which includes information indicating EP NG (or CP NG).

Further, in a case where the MFP 10 is belonging to a normal Wi-Fi NW (i.e., in case of normal Wi-Fi print OK), in S100 the CPU 32 generates response data which includes the set of normal Wi-Fi SSID and normal Wi-Fi BSSID included in the normal Wi-Fi WSI within the memory 34. Further, in a case where the MFP 10 is belonging to a WFD NW (i.e., in case of WFD print OK), in S100 the CPU 32 generates response data which includes the set of WFD SSID and WFD BSSID included in the WFD WSI within the memory 34.

In S102, the CPU 32 sends the response data to the portable terminal 50 via the NFC I/F 22. According to this, by using the response data, the portable terminal 50 can select the communication scheme for executing the sending of print data from the portable terminal 50 to the MFP 10 (S12, S30 of FIG. 3).

Figure 8:
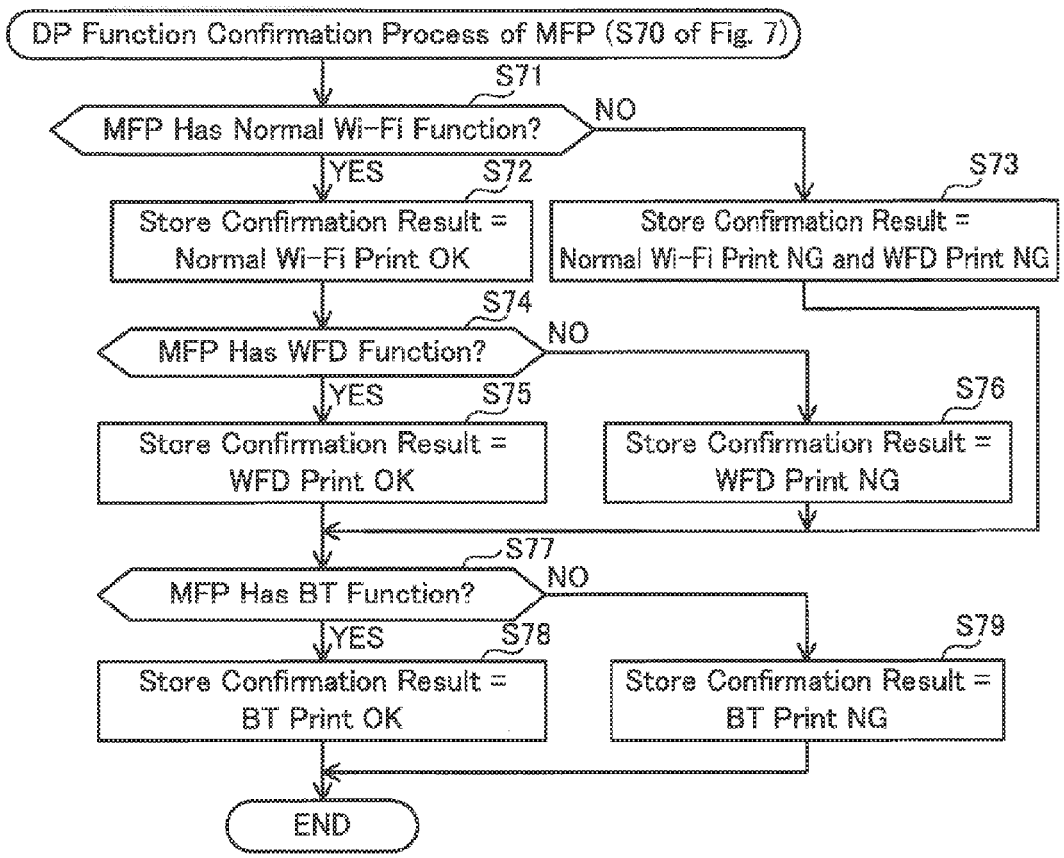
FIG. 8 shows a flowchart of a DP function confirmation process.

DP Function Confirmation Process; FIG. 8

The DP function confirmation process of S70 of FIG. 7 will be described with reference to FIG. 8. In S71, the CPU 32 determines whether the MFP 10 has the normal Wi-Fi function (i.e., whether the MFP 10 is comprising the wireless LAN I/F 20). In a case where the MFP 10 has the normal Wi-Fi function, the CPU 32 determines YES in S71 and, in S72, stores information indicating normal Wi-Fi print OK in the memory 34. Upon ending S72, processing proceeds to S74.

On the other hand, in a case where the MFP 10 does not have the normal Wi-Fi function, the CPU 32 determines NO in S71 and, in S73, stores information indicating normal Wi-Fi print NG, and information indicating WFD print NG in the memory 34. Wireless communication of the WFD scheme is a wireless communication having wireless communication of the normal Wi-Fi scheme as a prerequisite. Consequently, in the case where the MFP 10 does not have the normal Wi-Fi function (the case of NO in S71), the MFP 10 does not have the WFD function either (i.e., a program for executing a WFD communication is not being stored in the memory 34). Consequently, in S73, not only information indicating normal Wi-Fi print NG, but also information indicating WFD print NG is stored in the memory 34. Upon ending S73, processing proceeds to S77.

In S74, the CPU 32 determines whether the MFP 10 has the WFD function (i.e., whether a program for executing WFD communication is being stored in the memory 34). In a case where the MFP 10 has the WFD function, the CPU 32 determines YES in S74 and, in S75, stores information indicating WFD print OK in the memory 34. On the other hand, in a case where the MFP 10 does not have the WFD function, the CPU 32 determines NO in S74 and, in S76, stores information indicating WFD print NG in the memory 34. Upon ending S75 or S76, processing proceeds to S77.

In S77, the CPU 32 determines whether the MFP 10 has the BT function (i.e., whether the MFP 10 is comprising the BT I/F 24). In a case where the MFP 10 has the BT function, the CPU 32 determines YES in S77 and, in S78, stores information indicating BT print OK in the memory 34. On the other hand, in a case where the MFP 10 does not have the BT function, the CPU 32 determines NO in S77 and, in S79, stores information indicating BT print NG in the memory 34.

Figure 9:
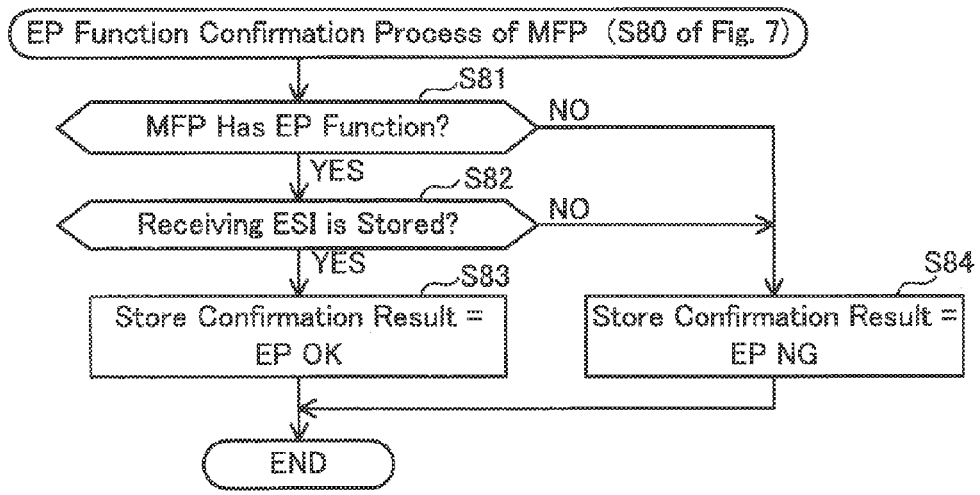
FIG. 9 shows a flowchart of an EP function confirmation process.

EP Function Confirmation Process; FIG. 9

The EP function confirmation process of S80 of FIG. 7 will be described with reference to FIG. 9. In S81, the CPU 32 determines whether the MFP 10 has the EP function (i.e., whether a program for receiving E-mail, and for executing printing in accordance with print data included in the E-mail, is being stored in the memory 34). In a case where the MFP 10 has the EP function, the CPU 32 determines YES in S81, and proceeds to S82. On the other hand, in a case where the MFP 10 does not have the EP function, the CPU 32 determines NO in S81 and, in S84, stores information indicating EP NO in the memory 34.

In S82, the CPU 32 determines whether the receiving ESI (i.e., the POP setting information), which is the ESI for the MFP 10 to receive E-mail, is being stored in the memory 34. In a case where the receiving ESI is being stored in the memory 34, the CPU 32 determines YES in S82 and, in S83, stores information indicating EP OK in the memory 34. On the other hand, in a case where the receiving ESI is not being stored in the memory 34, the CPU 32 determines NO in S82 and, in S84, stores information indicating EP NG in the memory 34.

Figure 10:
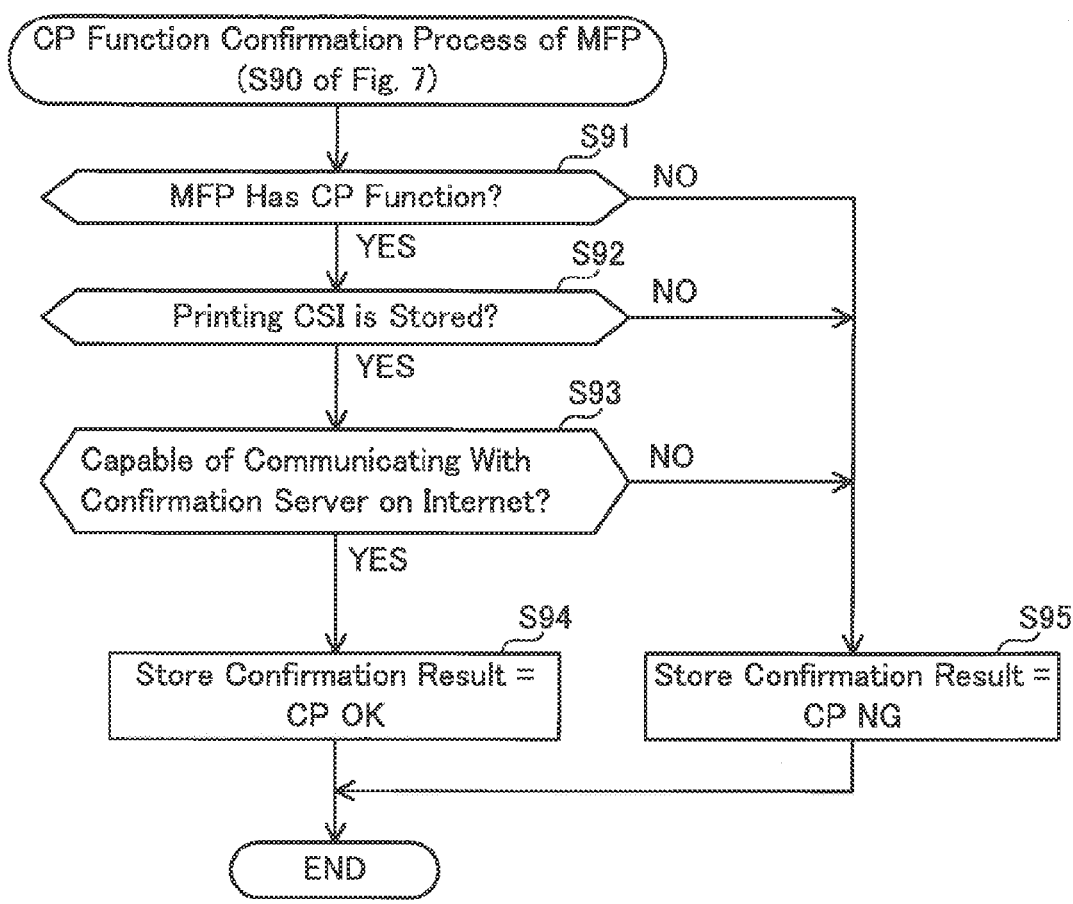
FIG. 10 shows a flowchart of a CP function confirmation process.

CP Function Confirmation Process; FIG. 10

The CP function confirmation process of S90 of FIG. 7 will be described with reference to FIG. 10. In S91, the CPU 32 determines whether the MFP 10 has the CP function (i.e., whether the print CL server 140 and a program for executing cloud communication are being stored in the memory 34). In a case where the MFP 10 has the CP function, the CPU 32 determines YES in S91, and proceeds to S92. On the other hand, in a case where the MFP 10 does not have the CP function, the CPU 32 determines NO in S91 and, in S95, stores information indicating CP NG in the memory 34.

In S92, the CPU 32 determines whether the printing CSI (i.e., a URL of the print CL server 140, account information, authentication information, etc.), which is the CSI for the MFP 10 to use the print CL server 140, is being stored in the memory 34. In a case where the printing CSI is being stored in the memory 34, the CPU 32 determines YES in S92, and proceeds to S93. On the other hand, in a case where the printing CSI is not being stored in the memory 34, the CPU 32 determines NO in S92 and, in S95, stores information indicating CP NG in the memory 34.

In S93, the CPU 32 determines whether the MFP 10 is capable of communicating with the confirmation server 130 on the Internet. Specifically, the CPU 32 sends a signal with a URL of the confirmation server 130 stored in advance in the memory 34 as a destination, and monitors whether a response signal is received from the confirmation server 130. In a case where the response signal is received from the confirmation server 130, the CPU 32 determines YES in S93 and, in S94, stores information indicating CP OK in the memory 34. On the other hand, in a case where a response signal is not received from the confirmation server 130, the CPU 32 determines NO in S93 and, in S95, stores information indicating CP NG in the memory 34. Moreover, NO may be determined in S93, e.g., in a case where a contract for Internet communication has not been made with a provider, in a case where a gateway for Internet communication is not functioning, etc.

Upon ending S102 of FIG. 7, in S104 the CPU 32 receives the selection result (i.e., DP, EP, or CP) from the portable terminal 50 via the NFC I/F 22. Next, in S110, the CPU 32 executes the destination information preparing process.

Preparing Process of Destination Information; FIG. 11

Contents of a preparing process of the destination information of S110 of FIG. 7 will be described with reference to FIG. 11. In S111, the CPU 32 determines whether the selection result is DP and, in the case where the selection result of the user is DP, determines YES in S111, and proceeds to S112. On the other hand, in the case where the selection result is EP or CP, the CPU 32 determines NO in S111, and proceeds to S118.

In S112, the CPU 32 determines whether information indicating normal Wi-Fi print OK was stored in the memory 34 in S70 of FIG. 7 (see FIG. 8). In the case where information indicating normal Wi-Fi print OK is being stored in the memory 34, the CPU 32 determines YES in S112, and proceeds to S113. On the other hand, in the case where information indicating normal Wi-Fi print NG is being stored in the memory 34, the CPU 32 determines NO in S112, and proceeds to S116.

In S113, by specifying the information (normal Wi-Fi SSID, normal Wi-Fi BSSID, and normal Wi-Fi IP address of the MFP 10) included in the normal Wi-Fi WSI of the MFP 10 from the memory 34, the CPU 32 prepares this information as the destination information. In the present embodiment, a security policy has been adopted in the normal Wi-Fi NW whereby the AP 100 is authorized to cause another device to participate in the normal Wi-Fi NW, but a device (e.g., the MFP 10) different from the AP 100 is not authorized to cause another device to participate in the normal Wi-Fi NW. Consequently, in S113, the CPU 32 does not prepare a password included in the normal Wi-Fi WSI of the MFP 10 (i.e., does not send a password as the destination information). However, in a variant, the CPU 32 may prepare a password (i.e., may send a password as the destination information).

Next, in S114, the CPU 32 determines whether information indicating WFD print OK was stored in the memory 34 in S70 of FIG. 7 (see FIG. 8). In the case where information indicating WFD print OK is being stored in the memory 34, the CPU 32 determines YES in S114, and proceeds to S115. On the other hand, in the case where information indicating WFD print NG is being stored in the memory 34, the CPU 32 determines NO in S114, and proceeds to S116.

In S115, the CPU 32 executes the following processes in accordance with the current state of the MFP 10 (G/O state, CL state, or device state). In the case where the current state of the MFP 10 is the G/O state, by specifying the information included in the WFD WSI of the MFP 10 (WFD SSID, WFD BSSID, WFD IP address of the MFP 10, and password) from the memory 34, the CPU 32 prepares this information as the destination information. Further, in the case where the current state of the MFP 10 is the CL state, by specifying the information included in the WFD WSI of the MFP 10 (WFD SSID, WFD BSSID, and WFD IP address of the MFP 10) from the memory 34, the CPU 32 prepares this information as the destination information.

In the present embodiment, a security policy has been adopted in the WFD NW whereby the G/O device is authorized to cause another device to participate in the WFD NW, but a CL device is not authorized to cause another device to participate in the WFD NW. Consequently, the CPU 32 prepares a password in the case where the current state of the MFP 10 is the G/O state, but does not prepare a password in the case where the current state of the MFP 10 is the CL state (i.e., does not send a password as the destination information). However, in a variant, the CPU 32 may prepare a password (i.e., may send a password as the destination information) in the case where the current state of the MFP 10 is the CL state.

Further, in the case where the current state of the MFP 10 is the device state, the CPU 32 moves the state of the MFP 10 to the G/O state. Here, the CPU 32 spontaneously moves the state of the MFP 10 to the G/O state without executing G/O negotiation. Next, the CPU 32 further generates the WFD WSI of the MFP 10 (i.e., WFD SSID, WFD BSSID, authentication scheme, encryption scheme, password, and WFD IP address) within the memory 34. The CPU 32 further generates a management list, in which the MAC address of the CL device is to be described, within the memory 34. At this stage, no MAC address has been described in the management list. That is, the CPU 32 forms a WFD NW to which only the MFP 10, which is the G/O device, belongs. Then, by specifying the information (WFD SSID, WFD BSSID, WFD IP address of the MFP 10, and password) included in the WFD WSI of the MFP 10 from the memory 34, the CPU 32 prepares this information as the destination information.

In S116, the MFP 10 determines whether information indicating BT print OK was stored in the memory 34 in S70 of FIG. 7 (see FIG. 8). In the case where information indicating BT print OK is being stored in the memory 34, the CPU 32 determines YES in S116, and proceeds to S117. On the other hand, in the case where information indicating BT print NG is being stored in the memory 34, the CPU 32 determines NO in S116, and ends the preparing process of the destination information.

In S117, in a case where the MFP 10 is currently belonging to the BT NW (i.e., in a case where the MFP 10 has established a BT connection with another device) the CPU 32 prepares the BT WSI of the MFP 10 as the destination information by specifying the BT WSI of the MFP 10 from the memory 34. Further, in a case where the MFP 10 is not currently belonging to the BT NW, the CPU 32 generates a new BT WSI within the memory 34. Then, the CPU 32 prepares the BT WSI of the MFP 10 as the destination information by specifying the BT WSI of the MFP 10 from the memory 34.

In S118, the CPU 32 determines whether the selection result is EP and, in a case where the selection result is EP, determines YES in S118, and proceeds to S119. On the other hand, in a case where the selection result is CP, the CPU 32 determines NO in S118, and proceeds to S120.

In S119, the CPU 32 prepares the E-mail address of the MFP 10 as the destination information by specifying the predetermined E-mail address of the MFP 10 from the memory 34. When S119 ends, the preparing process of the destination information ends.

In S120, the CPU 32 prepares the printing CSI as the destination information by specifying the printing CSI from the memory 34. When S120 ends, the preparing process of the destination information ends.

Upon ending S110 of FIG. 7, in S130 the CPU 32 sends the destination information to the portable terminal 50 via the NFC I/F 22. According to this, by using the destination information, the portable terminal 50 can send the print data to the MFP 10 (S54 of FIG. 3).

In S132, the CPU 32 receives print data from the portable terminal 50 in accordance with the communication scheme (i.e., direct scheme, E-mail scheme, or cloud scheme) indicated by the selection result received in S104. For example, in a case where the selection result is EP, the CPU 32 receives an E-mail which includes print data from the mail server 120 via the wireless LAN I/F 20 or another I/F (e.g., a wired communication I/F (not shown)). Consequently, the MFP 10 can receive the print data from the portable terminal 50 via the mail server 120 (i.e., via the internet). Further, e.g., in a case where the selection result is CP, the CPU 32 receives the print data from the print CL server 140 via the wireless LAN I/F 20 or another I/F. Consequently, the MFP 10 can receive the print data from the portable terminal 50 via the print CL server 140 (i.e., via the internet).

Further, e.g., in the case where the selection result is DP, the CPU 32 receives the print data via the wireless LAN I/F 20 or the BT I/F 24 by using the normal Wi-Fi NW, the WFD NW, or the BT NW. Consequently, the portable terminal 50 can receive the print data from the MFP 10 via a LAN (i.e., not via the Internet).

In S134, the CPU 32 supplies the print data to the print mechanism 16. According to this, the print mechanism 16 prints an image represented by the print data onto a print medium. Due to being an image file or the like, print data has a comparatively large data size. The communication speed of an NFC communication via the NFC I/Fs 22, 62 is slower than the communication speed of a communication via another I/F (e.g., the wireless LAN I/Fs 20, 60). Consequently, if a configuration is adopted in which the communication of print data between the MFP 10 and the portable terminal 50 is executed by using an NFC communication, a long time is required for the communication of the print data. By contrast, in the present embodiment, the MFP 10 and the portable terminal 50 execute a communication of the print data by using a communication different from the NFC communication, and consequently can execute the communication of the print data rapidly.

Figure 12:
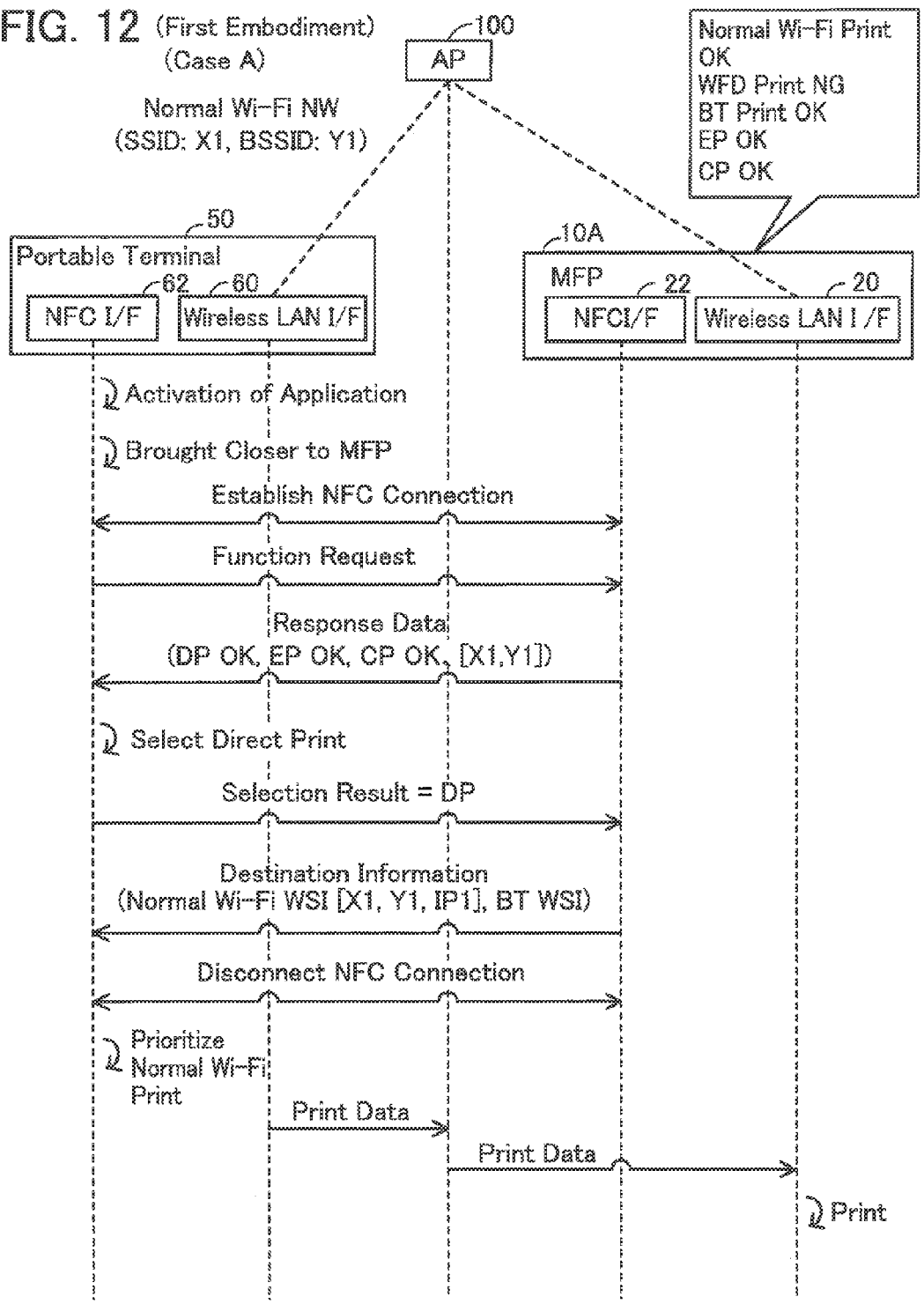
FIG. 12 shows a sequence view of a case A of the first embodiment.
Figure 13:
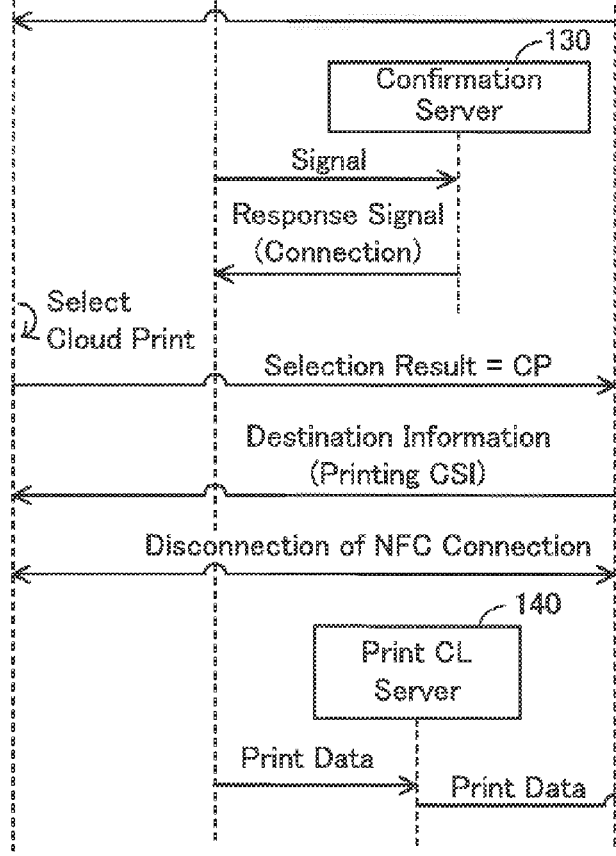
FIG. 13 shows a sequence view of a case B of the first embodiment.
Figure 14:
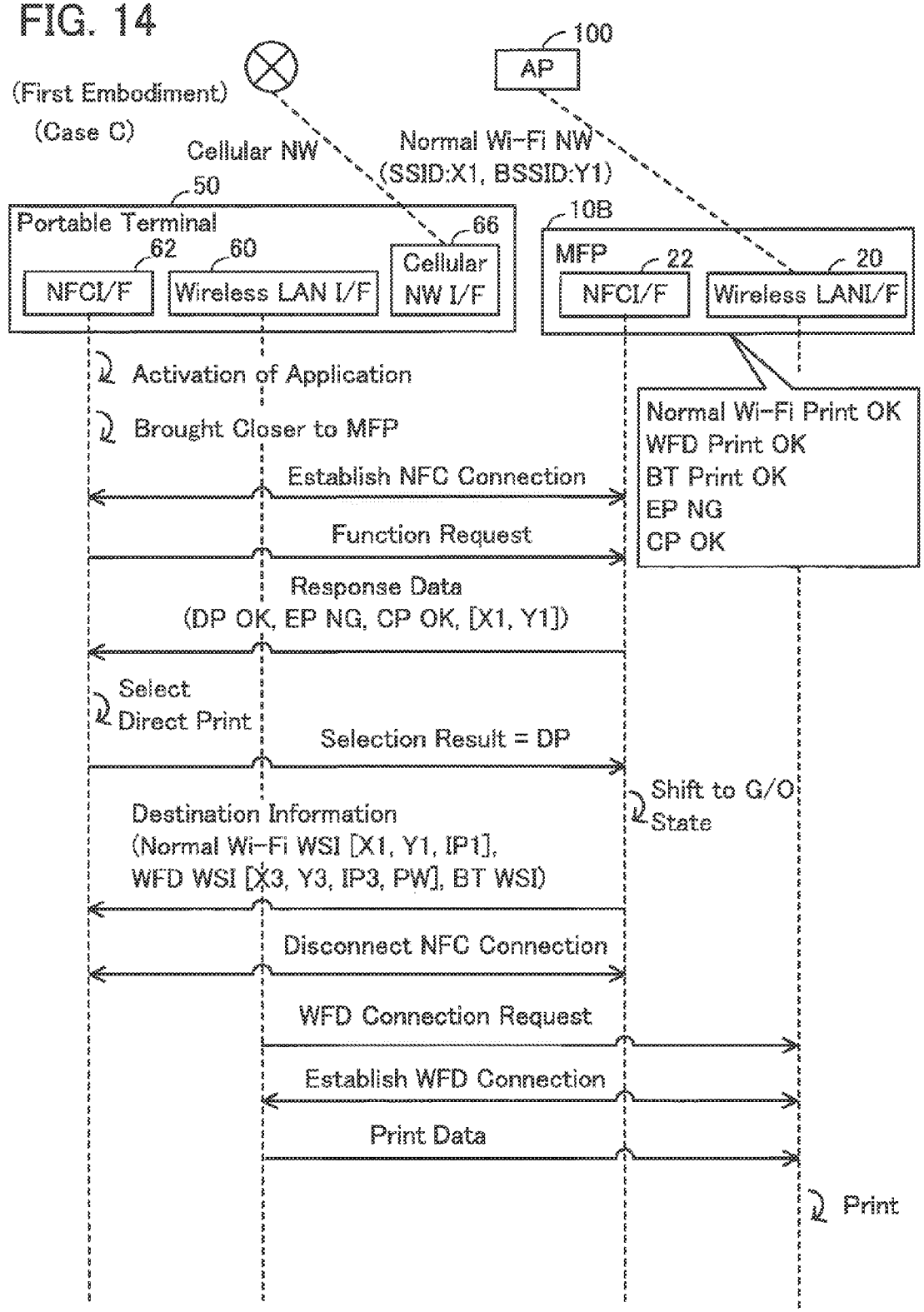
FIG. 14 shows a sequence view of a case C of the first embodiment.

Specific Cases; FIG. 12 to 14

Specific cases of the present embodiment will be described with reference to FIG. 12 to 14. Moreover, in FIG. 12 to 14, reference numbers different from the MFP 10 of FIG. 1 have been assigned, such as MFP 10A, 10B. If there are differences between the MFP of these cases (the MFP 10A, etc.) and the MFP 10 of FIG. 1, these differences will be described before the contents of each case are described.

Case A; FIG. 12

In case A, an MFP 10A is capable of executing normal Wi-Fi print, BT print, EP, and CP, but is not capable of executing WFD print. The MFP 10A and the portable terminal 50 are belonging to a normal Wi-Fi NW formed by the AP 100. In the normal Wi-Fi NW, "X1" is used as the SSID, and "Y1" is used as the BSSID. After activating the MFP application, the user of the portable terminal 50 brings the portable terminal 50 closer to the MFP 10A. Consequently, an NFC connection between the portable terminal 50 and the MFP 10A is established. The portable terminal 50 sends a function request to the MFP 100A by using the NFC connection (S10 of FIG. 3).

Upon receiving the function request from the portable terminal 50 (S60 of FIG. 7), the MFP 10A executes the confirmation processes (S70, S80, S90 of FIG. 7), and then generates response data that includes information indicating DP OK, information indicating EP OK, information indicating CP OK, the SSID "X1" and the BSSID "Y1" (S100 of FIG. 7). Moreover, since the MFP 10A is not capable of executing WFD print, but is capable of executing normal Wi-Fi print and BT print, the response data includes information indicating DP OK. The MFP 10A sends the response data to the portable terminal 50 by using the NFC connection (S102 of FIG. 7).

The portable terminal 50 receives the response data from the MFP 10A by using the NFC connection. In the present case, the set of SSID "X1" and BSSID "Y1" included in the response data, and the set of SSID "X1" and BSSID "Y1" included in the normal Wi-Fi WSI of the portable terminal 50 are identical (YES in S31 of FIG. 4), and consequently the portable terminal 50 selects DP (S32 of FIG. 4). The portable terminal 50 sends a selection result indicating DP to the MFP 10A by using the NFC connection (S50 of FIG. 3).

Upon receiving the selection result indicating DP (S104 of FIG. 7), the MFP 10A prepares the destination information (S110 of FIG. 7). Specifically, since information indicating normal Wi-Fi print OK is being stored in the memory 34 (YES in S112 of FIG. 11), the MFP 10A prepares, as the destination information, the information included in the normal Wi-Fi WSI of the MFP 10A (SSID "X1", BSSID "Y1", IP address "IP1" of the MFP 10A) (S113). Further, since information indicating BT print OK is being stored in the memory 34 (YES in S116 of FIG. 11), the MFP 100A prepares the BT WSI of the MFP 100A as the destination information (S117 of FIG. 11). The MFP 10A sends the destination information to the portable terminal 50 (S130 of FIG. 7).

Upon receiving the destination information from the MFP 10A (S52 of FIG. 3), the portable terminal 50 determines that the set SSID "X1" and BSSID "Y1" included in the destination information and the set SSID "X1" and BSSID "Y1" included in the normal Wi-Fi WSI of the portable terminal 50 are the same (i.e., the MFP 10A and the portable terminal 50 are belonging to the same normal Wi-Fi NW). Consequently, the portable terminal 50 prioritizes the normal Wi-Fi NW for sending the print data to the MFP 10A via the AP 100 (S54 of FIG. 3). According to this, the print process is executed in the MFP 10A (S134 of FIG. 7).

As described above, in a case where the MFP 10A and the portable terminal 50 are belonging to the same normal Wi-Fi NW, the portable terminal 50 can automatically select the appropriate print function (i.e., DP) from among the three print functions (i.e., DP, EP, CP) which the MFP 10A is capable of executing. That is, the portable terminal 50 can automatically select the appropriate communication scheme (i.e., the direct scheme) from among the three communication schemes (i.e., direct scheme, E-mail scheme, cloud scheme) which the MFP 10A is capable of using. Consequently, the portable terminal 50 can appropriately send the print data to the MFP 10A by using the selected communication scheme.

Case B; FIG. 13

In case B, an MFP 10B is capable of executing normal Wi-Fi print, WFD print, BT print, and CP, but is not capable of executing EP. The MFP 10B is belonging to a normal Wi-Fi NW (SSID "X1", BSSID "Y1") formed by an AP 100A. The MFP 10B further belongs as a CL device to a WFD NW (SSID "X3", BSSID "Y3") in which the PC 110 is a G/O device. The portable terminal 50 is belonging to a normal Wi-Fi NW (SSID "X2", BSSID "Y2") formed by an AP 100B which is different from the AP 100A.

Processes until the MFP 10B receives a function request are the same as in case A. The MFP 10B generates response data which includes information indicating DP OK, information indicating EP NG, information indicating CP OK, the set of SSID "X1" and BSSID "Y1", and the set of SSID "X3" and BSSID "Y3" (S100 of FIG. 7), and sends the response data to the portable terminal 50 by using the NFC connection (S102 of FIG. 7).

In the present case, the set of SSID "X1" and BSSID "Y1" included in the response data, and the set of SSID "X2" and BSSID "Y2" included in the normal Wi-Fi WSI of the portable terminal 50 are not identical. Further, the set of SSID "X3" and BSSID "Y3" included in the response data, and the set of SSID "X2" and BSSID "Y2" included in the normal Wi-Fi WSI of the portable terminal 50 are not identical (NO in S31 of FIG. 4). Further, the portable terminal 50 is belonging to a normal Wi-Fi NW (YES in S33). Upon sending a signal to the confirmation server 130, the portable terminal 50 can receive a response signal from the confirmation server 130 (YES in S34). Consequently, the portable terminal 50 executes the first selection process (S150).

In the first selection process (FIG. 5), CP and EP are prioritized over DP. Since the response data includes information indicating DP OK and CP OK, the portable terminal 50 selects CP from the two print functions (i.e., DP, CP) which the MFP 10B is capable of executing (S152 of FIG. 5). The portable terminal 50 sends the selection result indicating CP to the MFP 10B by using the NFC connection (S50 of FIG. 3).

Upon receiving the selection result indicating CP (S104 of FIG. 7), the MFP 10B prepares the destination information (S110 of FIG. 7). Specifically, the MFP 10B prepares, as the destination information, the information included in the printing CSI of the MFP 10B (the URL of the print CL server 140, etc.) (S120 of FIG. 11). The MFP 10B sends the destination information to the portable terminal 50 (S130 of FIG. 7).

Upon receiving the destination information from the MFP 10B (S52 of FIG. 3), the portable terminal 50 sends print data to the print CL server 140 by using the printing CSI included in the destination information (S54). Since the portable terminal 50 is belonging to the normal Wi-Fi NW, the portable terminal 50 sends the print data to the print CL server 140 not via the cellular NW I/F 66, but via the wireless LAN I/F 60 (i.e., by using the normal Wi-Fi NW). That is, the print data is sent to the MFP 10B via the AP 100B and the print CL server 140.

As described above, in the case where the portable terminal 50 is belonging to the normal Wi-Fi NW, the portable terminal 50 can appropriately select CP from the two print functions (i.e., DP, CP) which the MFP 10B is capable of executing. According to this, the portable terminal 50 does not need to newly establish a wireless connection with the MFP 10B, and so the processing load of the portable terminal 50 can be reduced. Further, since the portable terminal 50 is using the normal Wi-Fi NW, and not a cellular NW, the communication of print data is not subject to being charged for.

Case C; FIG. 14

In case C, the MFP 10B is the same device as the MFP 10B of case B, and is capable of executing normal Wi-Fi print, WFD print, BT print, and CP, but is not capable of executing EP. The MFP 10B belongs to a normal Wi-Fi NW (SSID "X1", BSSID "Y1") formed by the AP 100, but is not belonging to a WFD NW. The portable terminal 50 belongs to a cellular NW, but does not belong to a wireless LAN (i.e., a normal Wi-Fi NW, a WFD NW).

Processes until the MFP 10B receives a function request are the same as in case A. The MFP 10B generates response data which includes information indicating DP OK, information indicating EP NG, information indicating CP OK, SSID "X1" and BSSID "Y1" (S100 of FIG. 7), and sends the response data to the portable terminal 50 by using the NFC connection (S102 of FIG. 7).

In the present case, neither the normal Wi-Fi WSI nor the WFD WSI of the portable terminal 50 is being stored in the memory 74 (NO in S31 of FIG. 4). Further, the portable terminal 50 belongs to the cellular NW (YES in S38 of FIG. 4), but does not belong to a wireless LAN (NO in S33 of FIG. 4). Consequently, the portable terminal 50 executes the second selection process (S160).

In the second selection process (FIG. 6), DP is prioritized over CP and EP. Since the response data includes information indicating DP OK and CP OK, the portable terminal 50 selects DP from among the two print functions (i.e., DP, CP) which the MFP 10B is capable of executing (S162 of FIG. 6). The portable terminal 50 sends a selection result indicating DP to the MFP 10B by using the NFC connection (S50 of FIG. 3).

Upon receiving the selection result indicating DP (S104 of FIG. 7), the MFP 10B prepares the destination information (S110 of FIG. 7). Specifically, since information indicating normal Wi-Fi print OK is being stored in the memory 34 (YES in S112 of FIG. 11), the MFP 10B prepares, as the destination information, the information included in the normal Wi-Fi WSI of the MFP 10B (SSID "X1", BSSID "Y1", IP address "IP1" of the MFP 10B) (S113). Further, since information indicating WFD print OK is being stored in the memory 34 (YES in S114), the MFP 10B spontaneously shifts to G/O state, generates WFD WSI, and prepares the information included in that WFD WSI (SSID "X3", BSSID "Y3", IP address "IP3" of the MFP 10B, password "PW") as the destination information (S115). Moreover, since the MFP 10B is a G/O device, the WFD WSI includes a password. Further, since information indicating BT print OK is being stored in the memory 34 (YES in S116), the MFP 10B prepares the BT WSI of the MFP 10B as the destination information (S117). The MFP 10B sends the destination information to the portable terminal 50 (S130 of FIG. 7).

Upon receiving the destination information from the MFP 10B (S52 of FIG. 3), the portable terminal 50 determines that, as the MFP 10B and the portable terminal 50 are not belonging to the same NW, it is not possible to send the print data by using the normal Wi-Fi NW (S54). The portable terminal 50 determines that utilization of the WFD WSI which, of the WFD WSI and BT WSI included in the destination information, corresponds to the WFD communication having a faster communication speed will be prioritized (i.e., determines to send the print data by using the WFD NW). That is, the portable terminal 50 sends a connection request, to participate in the WFD NW in which the MFP 10B is a G/O device, to the MFP 10B via the wireless LAN I/F 60 (S54). According to this, a wireless connection between the MFP 10B and the portable terminal 50 is established, and the portable terminal 50 can participate in the WFD NW as a CL device. The portable terminal 50 sends print data to the MFP 10B via the wireless LAN I/F 60. According to this, by using the WFD NW, the portable terminal 50 can send the print data to the MFP 10B not via another device.

As described above, in a case where the portable terminal 50 belongs to a cellular NW but does not belong to a wireless LAN, the portable terminal 50 can appropriately select DP from among the two print functions (i.e., DP, CP) which the MFP 10B is capable of executing. According to this, since the portable terminal 50 is using the WFD NW, and not a cellular NW, the communication of print data is not subject to being charged for.

Corresponding Relationships

The portable terminal 50 and the MFP 10 are respectively examples of the "terminal apparatus" and the "first function executing apparatus". In case A of FIG. 12, the three communication schemes DP, EP, and CP are an example of the "M1 items of communication schemes", and DP is an example of the "particular communication scheme". In case B of FIG. 13, the two communication schemes DP and CP are an example of the "M1 items of communication schemes", and CP is an example of the "particular communication scheme". In case C of FIG. 14, the two communication schemes DP and CP are an example of the "M1 items of communication schemes", and DP is an example of the "particular communication scheme".

Moreover, the MFP 10A of case A of FIG. 12, and the MFP 10B of case B of FIG. 13 can also be considered as an example of the "first function executing apparatus" and the "second function executing apparatus" respectively. In this case, in case B, the two communication schemes DP and CP are an example of the "M2 items of communication schemes", and CP is an example of the "different communication scheme which is different from the particular communication scheme".

The NFC I/F 62 and the wireless LAN I/F 60 are respectively examples of the "first interface" and the "second interface". The response data of case A of FIG. 12, and the response data of case B are respectively examples of the "first information" and the "second information". CP, DP, the printing CSI and the confirmation server 130 are respectively examples of the "first communication scheme", the "second communication scheme", the "first communication setting information" and the "server". The normal Wi-Fi NW of case A is an example of the "particular local area network". The information included in the response data of case A (i.e., DP OK, EP OK, CP OK) is an example of the "first data". Further, in case A, if the printing CSI is not being stored in the MFP 10A (NO in S92 of FIG. 10), the response data indicates DP OK, EP OK, and CP NG. Further, in case A, if the MFP 10A is not capable of communicating with the confirmation server 130 (NO in S93 of FIG. 10), the response data indicates DP OK, EP OK, and CP NG. The information (i.e., DP OK, EP OK, CP NG) included in the response data of these cases is an example of the "second data".

The process of S12, the process of S30, the process of S50, the process of S52, and the process of S54 of FIG. 3 are respectively examples of the "receiving first information", the "selecting", the "sending a selection result", the "receiving particular destination information", and the "sending first print data".

Second Embodiment

Points different from the first embodiment will be described. In the present embodiment, also, the portable terminal 50 sends print data to the MFP 10 in accordance with a communication scheme selected by the portable terminal 50. In the first embodiment, the MFP 10 sends the destination information to the portable terminal 50 after having received the selection result whereas, in the present embodiment, the MFP 10 sends response data which includes the destination information to the portable terminal 50.

Figure 15:
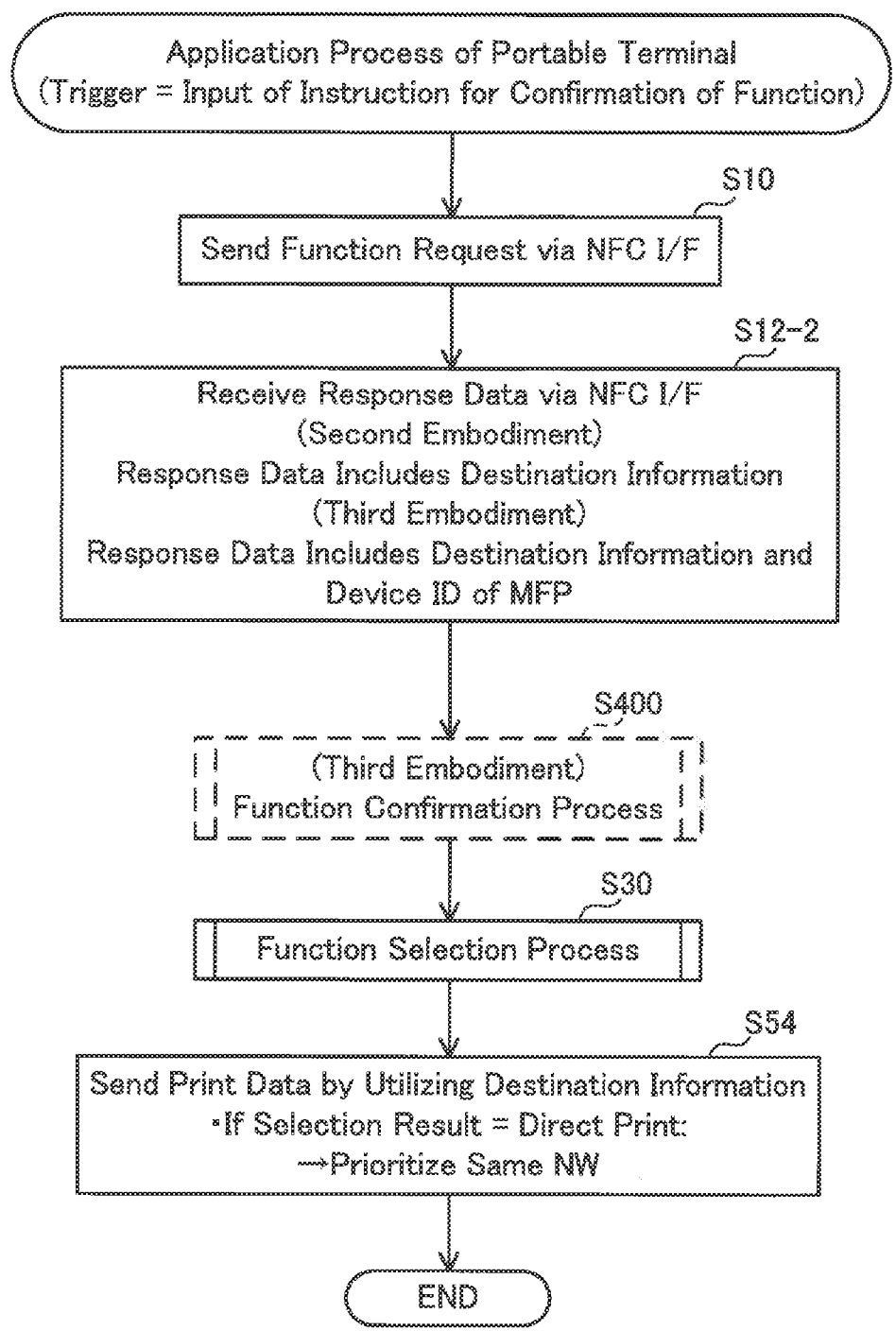
FIG. 15 shows a flowchart of an application process of a portable terminal of a second embodiment.

Application Process of Portable Terminal 50; FIG. 15

Contents of a process realized by an MFP application of the present embodiment will be described with reference to FIG.

15. S10 is the same as S10 of FIG. 3. In S12-2, the CPU 72 receives response data including destination information from the MFP 10 via the NFC I/F 62.

As described above, in the first embodiment, in S52 of FIG. 3, only one item of destination information corresponding to the print function (i.e., DP, EP, or CP) indicated by the selection result is received. For example, in a case where the selection result is EP, only the destination information corresponding to EP (i.e., E-mail address) is received, and destination information corresponding to DP (i.e., the normal Wi-Fi WSI, etc.) and destination information corresponding to CP (i.e., the printing CSI) are not received.

By contrast, in the present embodiment, the response data received in S12-2 includes all the one or more items of destination information corresponding to the one or more print functions (DP, EP, CP) which the MFP 10 is capable of executing. For example, in a case where the MFP 10 is DP OK, EP OK, and CP OK, the following three items of destination information are received: the destination information corresponding to DP (i.e., normal Wi-Fi WSI, etc.), the destination information corresponding to EP (i.e., E-mail address), and the destination information corresponding to CP (i.e., printing CSI).

Thus, in the present embodiment, the CPU 72 executes one round trip of communication which is sending a function request (S10) and receiving response data such as DP OK, etc., (S12-2). That is, the CPU 72 executes one round trip of communication in one session of a NFC connection. Upon ending S12-2, the NFC connection is disconnected.

S30 is the same as S30 of FIG. 3. Next, in S54, the CPU 72 sends print data to the MFP 10 by using the destination information which, from among the one or more items of destination information received in S12-2, corresponds to the selection result of the function selection process of S30.

For example, in S12-2, a situation is assumed in which all three items of the destination information are received. In a case where the selection result is EP, the CPU 72 sends an E-mail which includes the print data by using the destination information which, from among the three items of destination information, corresponds to EP (i.e., the E-mail address). Further, in a case where the selection result is CP, the CPU 72 sends the print data to the print CL server 140 by using the destination information which, from among the three items of destination information, corresponds to CP (i.e., the printing CSI). Further, in a case where the selection result is DP, the CPU 72 sends the print data to the MFP 10 by using the destination information which, from among the three items of destination information, corresponds to DP (i.e., the normal Wi-Fi WSI, etc.). Moreover, the point of prioritizing a NW to which both the MFP 10 and the portable terminal 50 are belonging in a case where the selection result is DP, is the same as in the first embodiment.

As described above, in the present embodiment, the portable terminal 50 can receive response data which includes the destination information from the MFP 10, and consequently can send the print data to the MFP 10 by using that destination information. Consequently, as in the first embodiment, the portable terminal 50 does not need to send the selection result to the MFP 10, and the MFP 10 does not need to send the destination information corresponding to the selection result to the portable terminal 50. Consequently, the sending of print data to the MFP 10 from the portable terminal 50 can be executed rapidly.

Figure 16:
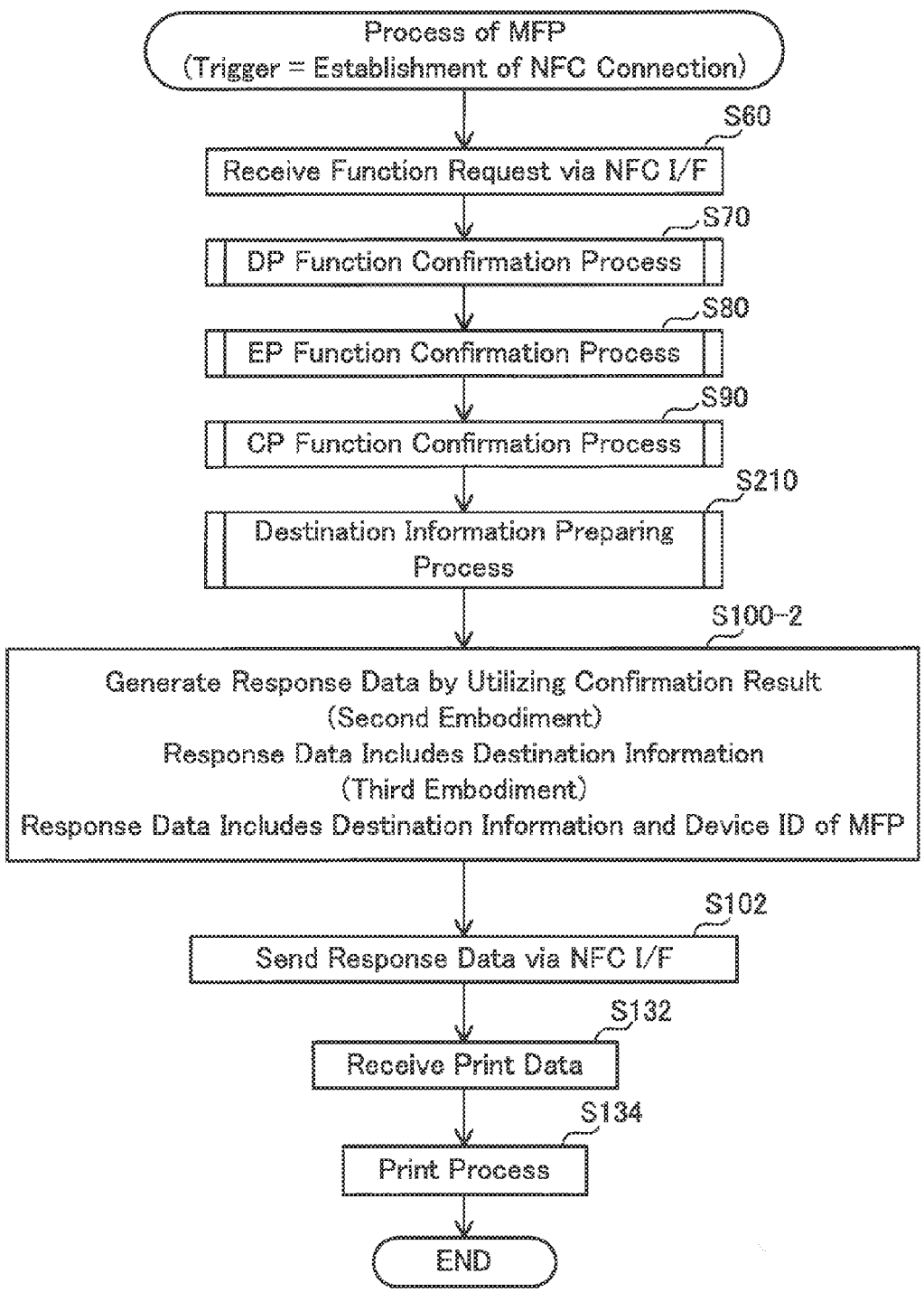
FIG. 16 shows a flowchart of a process of an MFP of the second embodiment.

Process of MFP 10; FIG. 16

Contents of a process executed by the MFP 10 will be described with reference to FIG. 16. S60 to S90 are the same as S60 to S90 of FIG. 7. In S210, the CPU 32 executes a preparing process of the destination information. Contents of the preparing process of the destination information will be described in detail later. Next, in S100-2, the CPU 32 generates response data that includes the destination information prepared in S210. S102, S132, S134 are the same as S102, S132, S134 of FIG. 7.

Figure 17:
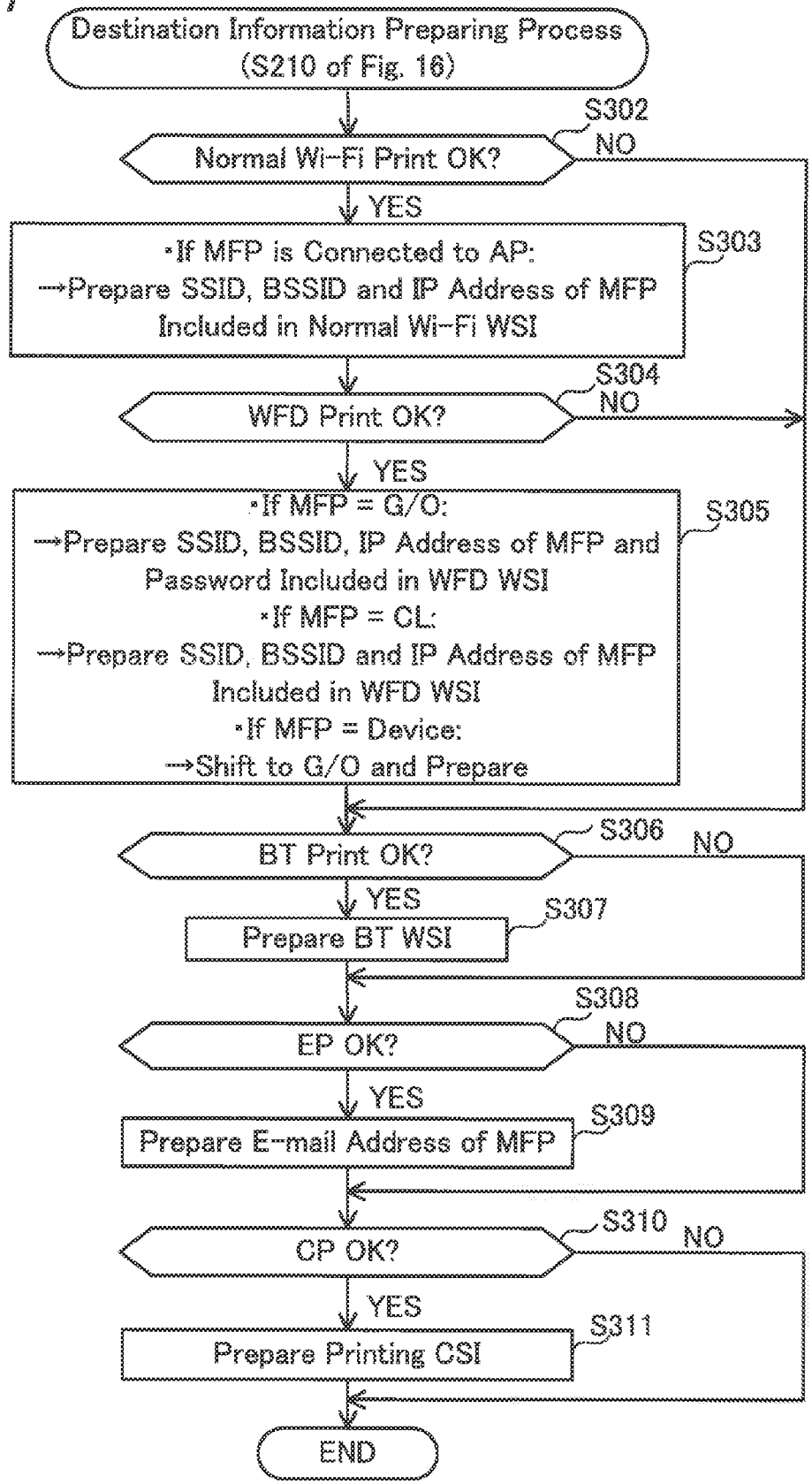
FIG. 17 shows a flowchart of a destination information preparing process of the second embodiment.

Preparing Process of Destination Information; FIG. 17

Contents of the preparing process of the destination information of S210 of FIG. 16 will be described with reference to FIG. 17. S302 to S307 are the same as S112 to S117 of FIG. 11. In S308, the CPU 32 determines whether information indicating EP OK was stored in the memory 34 in S80 of FIG. 16 (see FIG. 9). In a case where information indicating EP OK is being stored in the memory 34, the CPU 32 determines YES in S308, and proceeds to S309, and in a case where information indicating EP NG is being stored in the memory 34, the CPU 32 determines NO in S308, and proceeds to S310. S309 is the same as S119 of FIG. 11.

In S310, the CPU 32 determines whether information indicating CP OK was stored in the memory 34 in S90 of FIG. 16 (see FIG. 10). In a case where information indicating CP OK is being stored in the memory 34, the CPU 32 determines YES in S310, and proceeds to S311, and in a case where information indicating CP NG is being stored in the memory 34, the CPU 32 determines NO in S310, and ends the preparing process of the destination information. S311 is the same as S120 of FIG. 11.

In the preparing process of the destination information of FIG. 17, all the one or more items of destination information corresponding to the one or more print functions (DP, EP, CP) which the MFP 10 is capable of executing are prepared. For example, in a case where the MFP 10 is DP OK, EP OK, and CP OK, the following three items of destination information are prepared: the destination information corresponding to DP (S303, S305, S307), the destination information corresponding to EP (S309), and the destination information corresponding to CP (S311).

Figure 18:
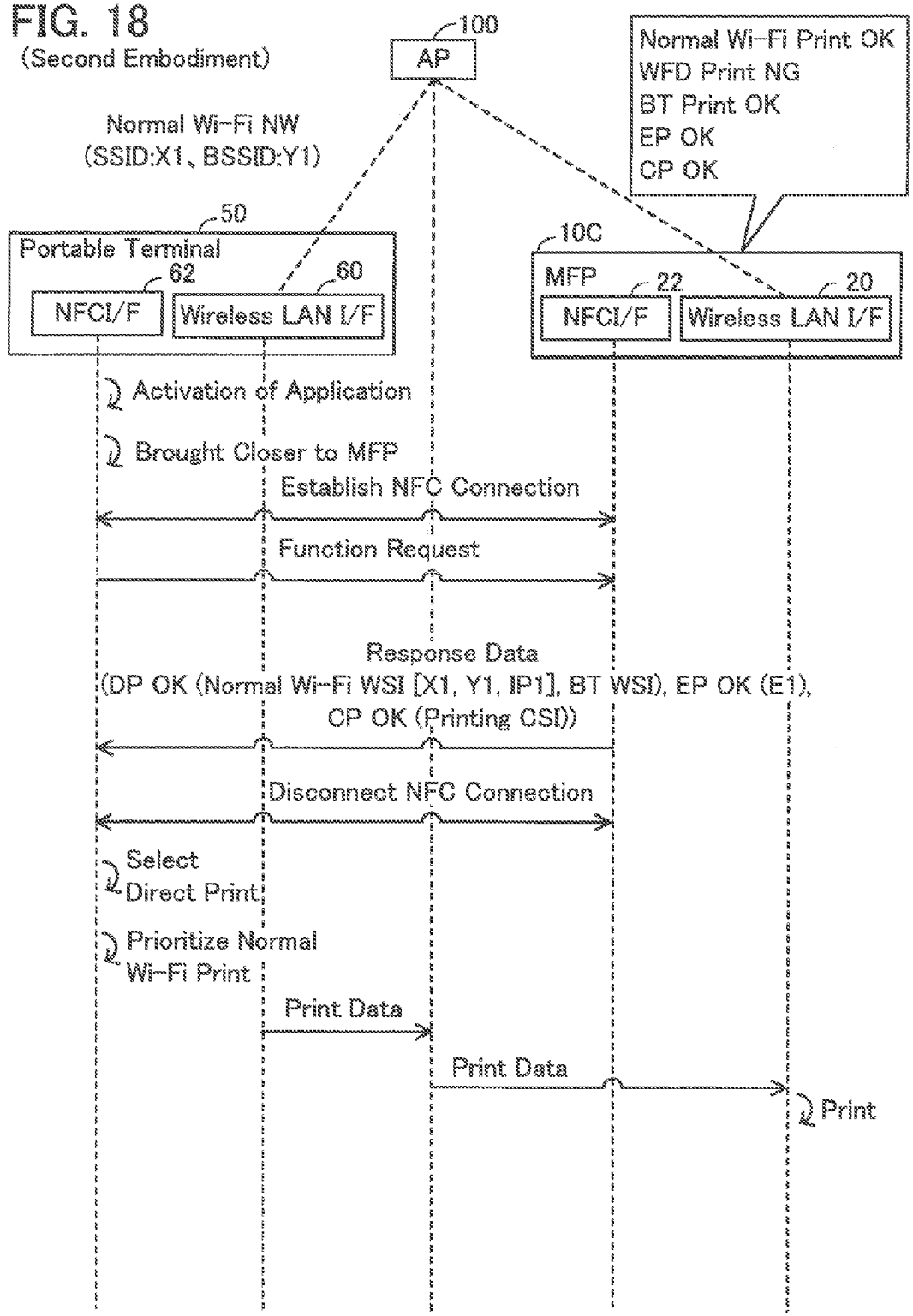
FIG. 18 shows a sequence view of processes executed by devices of the second embodiment.

Specific Case; FIG. 18

A specific case realized by the processes of FIG. 15 and FIG. 16 will be described with reference to FIG. 18. An MFP 10C is capable of executing normal Wi-Fi print, BT print, EP, and CP, but is not capable of executing WFD print. Further, the MFP 10C and the portable terminal 50 are belonging to a normal Wi-Fi NW (SSID "X1", BSSID "Y1") formed by the AP 100.

In the present case, response data sent from the MFP 10C to the portable terminal 50 includes not only information indicating DP OK, information indicating EP OK, and information indicating CP NG, but also destination information corresponding to DP (i.e., "X1, Y1, IP1", "BT WSI"), destination information corresponding to EP (i.e., mail address "E1" of the MFP 10), and destination information corresponding to CP (i.e., the "printing CSI") (S210 of FIG. 16). That is, the response data includes three items of destination information.

Then, as in case A of FIG. 12, the portable terminal 50 selects DP from among the three print functions (i.e., DP, EP, CP) which the MFP 10C is capable of executing (S30 of FIG. 15). Then, the portable terminal 50 sends print data to the MFP 10C by using the destination information which, from among the three items of destination information included in the response data, corresponds to DP (S54 of FIG. 15). More specifically, the portable terminal 50 determines to prioritize the utilization of the normal Wi-Fi NW to which both the MFP 10C and the portable terminal 50 are belonging (i.e., determines to prioritize the utilization of the normal Wi-Fi WSI), and consequently the portable terminal 50 can send the print data to the MFP 10C via the AP 100. Moreover, in the case of FIG. 18, the three items of destination information included in the response data are an example of the "M1 items of the destination information".

Third Embodiment

Points differing from the second embodiment will be described. In the present embodiment, the portable terminal 50 can execute a function confirmation process (to be described, S400 of FIG. 15), limiting the type of print functions capable of being selected by the portable terminal 50.

Application Process of Portable Terminal 50; FIG. 15

In the present embodiment, the response data received in S12-2 further includes a device ID of the MFP 10 (see S100-2 of FIG. 16). The device ID is a unique ID assigned to the MFP 10 by the vendor of the MFP 10. Next, the CPU 72 executes the function confirmation process of S400. As will be described in detail later, in the function confirmation process, information (DP OK, EP OK, CP OK) written in the response data can be changed (see FIG. 19). Consequently, it is possible to limit the types of print functions selected in the function selection process of S30, i.e., the types of print functions that can be selected by the portable terminal 50. Other processes are the same as the second embodiment.

Figure 19:
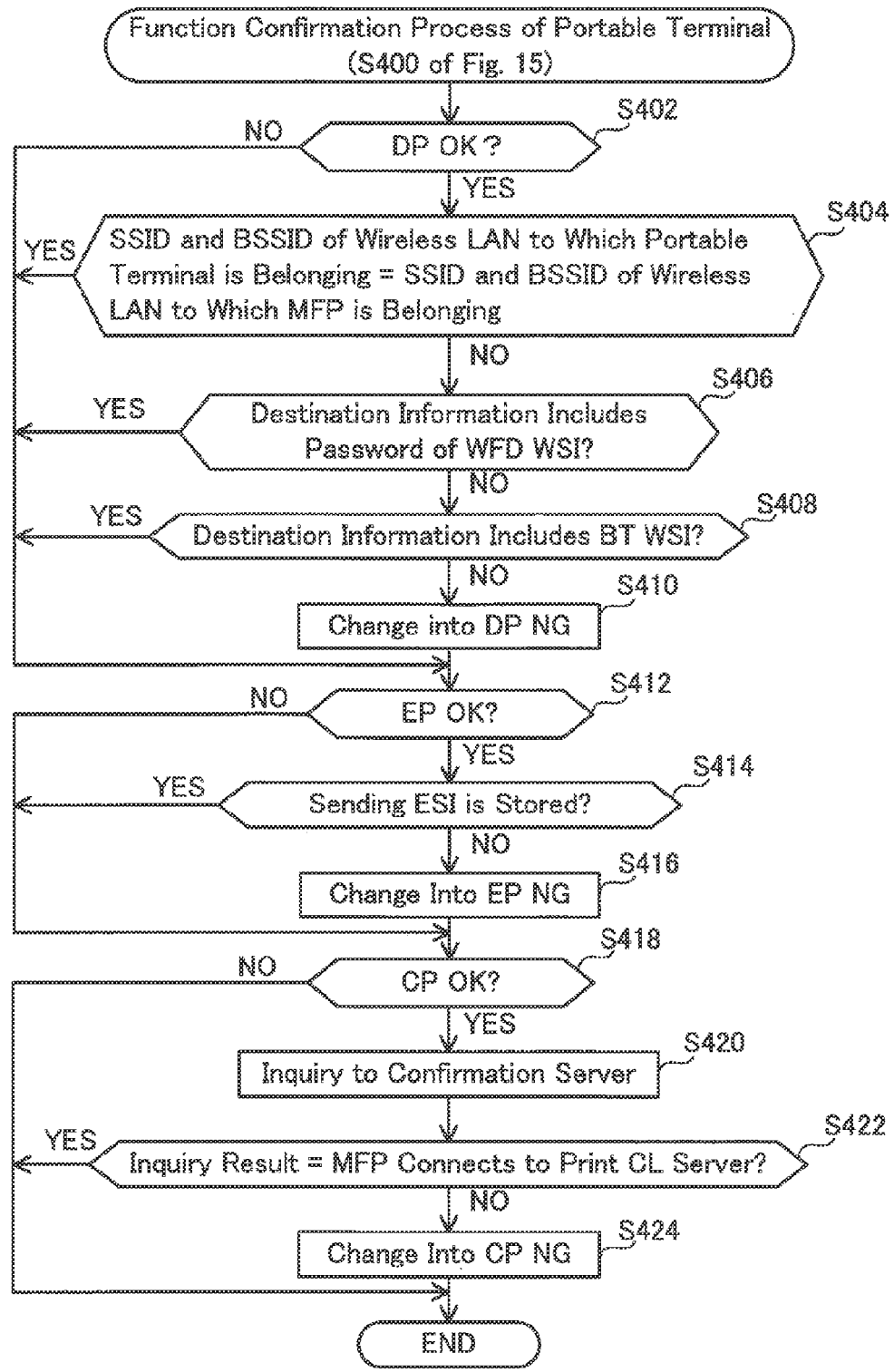
FIG. 19 shows a flowchart of a function confirmation process of a third embodiment.

Function Confirmation Process of Portable Terminal 50; FIG. 19

The function confirmation process of S400 of FIG. 15 will be described with reference to FIG. 19. In S402, the CPU 72 determines whether information indicating DP OK is included in the response data. In a case where information indicating DP OK is included in the response data, the CPU 72 determines YES in S402, and proceeds to S404. On the other hand, in a case where information indicating DP NG is included in the response data, the CPU 72 determines NO in S402, and proceeds to S412.

In S404, the CPU 72 determines whether the MFP 10 and the portable terminal 50 are belonging to the same normal Wi-Fi NW or the same WFD NW. In a case where either the normal Wi-Fi WSI or the WFD WSI of the portable terminal 50 is not being stored in the memory 74, the CPU 72 determines NO in S404, and proceeds to S406.

In a case where the normal Wi-Fi WSI of the portable terminal 50 is being stored in the memory 74, the CPU 72 determines whether a set of SSID and BSSID (called "first set" below) which is identical to the set of normal Wi-Fi SSID and normal Wi-Fi BSSID included in the normal Wi-Fi WSI, is included in the response data. In a case where the first set is included in the response data, the CPU 72 determines YES in S404, and proceeds to S412, and in a case where the first set is not included in the response data, the CPU 72 determines NO in S404, and proceeds to S406.

Further, in a case where the WFD WSI of the portable terminal 50 is being stored in the memory 74, the CPU 72 determines whether a set of SSID and BSSID (called "second set" below) which is identical to the set of WFD SSID and WFD BSSID of that WFD WSI, is included in the response data. In a case where the second set is included in the response data, the CPU 72 determines YES in S404, and proceeds to S412, and in a case where the second set is not included in the response data, the CPU 72 determines NO in S404, and proceeds to S406.

In S406, the CPU 72 determines whether the password of the WFD WSI of the MFP 10 is included in the response data. As described above, in a case where the MFP 10 is in the G/O state, the response data includes the password of the WFD WSI of the MFP 10 (see S305 of FIG. 17). In a case where the password is included in the response data, the CPU 72 determines YES in S406, and proceeds to S412, and in a case where the password is not included in the response data, the CPU 72 determines NO in S406, and proceeds to S408.

In S408, the CPU 72 determines whether the BT WSI of the MFP 10 is included in the response data. In a case where the BT WSI is included in the response data, the CPU 72 determines YES in S408, and proceeds to S412, and in a case where the BT WSI is not included in the response data, the CPU 72 determines NO in S408, and proceeds to S410.

In a case where NO is determined in any of S404, S406, and 408, a LAN to which both the MFP 10 and the portable terminal 50 are belonging is not realized, and consequently the MFP 10 and the portable terminal 50 cannot communicate print data by using the direct communication scheme. Consequently, in S410, the CPU 72 changes the information indicating DP OK included in the response data received in S12-1 of FIG. 15 to information indicating DP NG. According to this, in S30 of FIG. 15, the CPU 72 cannot select DP. When S410 ends, processing proceeds to S412.

In S412, the CPU 72 determines whether information indicating EP OK is included in the response data. In a case where information indicating EP OK is included in the response data, the CPU 72 determines YES in S412, and proceeds to S414. On the other hand, in a case where information indicating EP NO is included in the response data, the CPU 72 determines NO in S412, and proceeds to S418.

In S414, the CPU 72 determines whether the sending ESI, which is the ESI for sending E-mail, is being stored in the memory 74. In a case where the sending ESI is being stored in the memory 74, the CPU 72 determines YES in S414, and proceeds to S418, and in a case where the sending ESI is not being stored in the memory 74, the CPU 72 determines NO in S414, and proceeds to S416.

In a case where NO is determined in S416, the portable terminal 50 cannot send E-mail, and consequently the MFP 10 and the portable terminal 50 cannot communicate print data by using the E-mail communication scheme. Consequently, in S416, the CPU 72 changes the information indicating EP OK included in the response data received in S12-1 of FIG. 15 to information indicating EP NG. According to this, in S30 of FIG. 15, the CPU 72 cannot select EP. When S416 ends, processing proceeds to S418.

In S418, the CPU 72 determines whether information indicating CP OK is included in the response data. In a case where information indicating CP OK is included in the response data, the CPU 72 determines YES in S418, and proceeds to S420. On the other hand, in a case where information indicating CP NG is included in the response data, the CPU 72 determines NO in S418, and ends the function confirmation process.

As described above, the response data received in S12-2 of FIG. 15 includes the device ID of the MFP 10. In S420, the CPU 72 sends an inquiry signal that includes the device ID of the MFP 10 to the confirmation server 130 via the wireless LAN I/F 60 or another I/F (e.g., the cellular NW I/F 66).

Upon receiving the inquiry signal that includes the device ID of the MFP 10, the confirmation server 130 determines whether a connection between the MFP 10 and the print CL server 140 is established. For example, the confirmation server 130 supplies the device ID of the MFP 10 to the print CL server 140, and acquires information from the print CL server 140 indicating whether or not there is the connection. Then, the confirmation server 130 sends an inquiry result to the MFP 10 indicating connection or no-connection in accordance with the acquired information.

In S422, the CPU 72 determines whether the inquiry result received from the confirmation server 130 indicates connection. In a case where the inquiry result indicates connection, the CPU 72 determines YES in S422, and ends the function confirmation process, and in a case where the inquiry result indicates no-connection, the CPU 72 determines NO in S422, and proceeds to S424.

In the present embodiment, in order to receive print data from the print CL server 140, the MFP 10 must be constantly connected with the print CL server 140. Consequently, in a case where NO is determined in S422, the MFP 10 cannot receive the print data from the print CL server 140, and consequently the MFP 10 and the portable terminal 50 cannot communicate print data by using the cloud communication scheme. Consequently, in S424, the CPU 72 changes the information indicating CP OK included in the response data received in S12-1 of FIG. 15 to information indicating CP NG. According to this, the CPU 72 cannot select CP in S30 of FIG. 15. When S424 ends, the function confirmation process ends.

Figure 20:
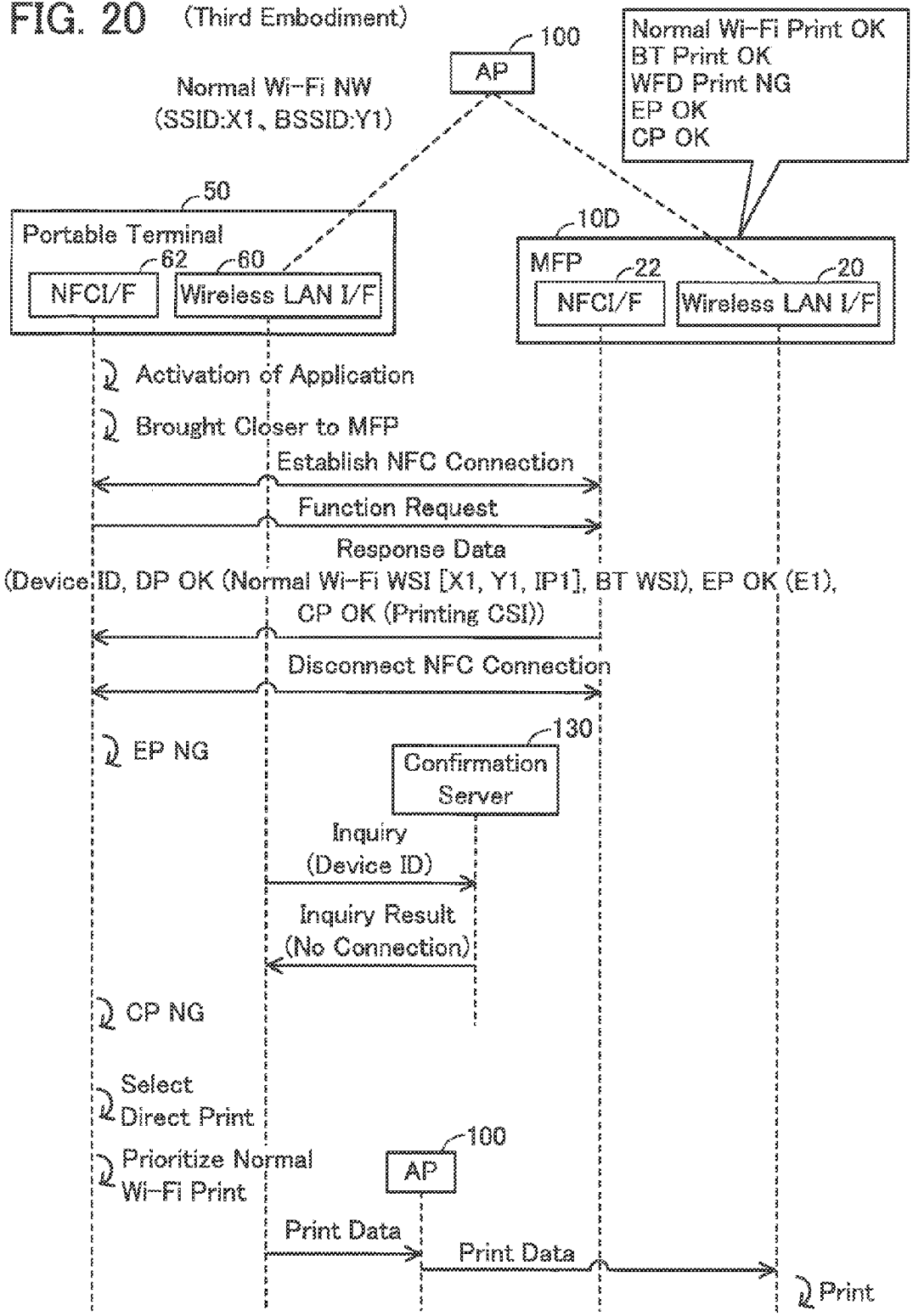
FIG. 20 shows a sequence view of processes executed by devices of the third embodiment.

Specific Case; FIG. 20

A specific case realized by processes of FIG. 15 (particularly S400) and FIG. 16 will be described with reference to FIG. 20. An MFP 10D is capable of executing normal Wi-Fi print, BT print, EP, and CP, and is not capable of executing WFD print. The MFP 10D and the portable terminal 50 are belonging to a normal Wi-Fi NW (SSID "X1", BSSID "Y1") formed by the AP 100.

In the present case, the response data sent to the portable terminal 50 from the MFP 10D includes device ID of the MFP 10D, information indicating DP OK, information indicating EP OK, information indicating CP OK, the destination information corresponding to DP (i.e., "X1, Y1, IP1", "BT WSI"), the destination information corresponding to EP (i.e., mail address "E1" of the MFP 10D), and the destination information corresponding to CP (i.e., the printing CSI) (S210, S100-2 of FIG. 16).

Next, the portable terminal 50 executes the function confirmation process (S400 of FIG. 15). Since the response data includes a set of SSID and BSSID identical to the set of "X1" and "Y1" of the normal Wi-Fi NW to which the portable terminal 50 is belonging (YES in S404 of FIG. 19), the portable terminal 50 does not change the information indicating DP OK to information indicating DP NG.

In the present case, the sending ESI, for executing the sending of E-mail, is not being stored in the memory 74 of the portable terminal 50 (NO in S414 of FIG. 19), and consequently the portable terminal 50 changes the information indicating EP OK to information indicating EP NG (S416).

The portable terminal 50 sends an inquiry signal that includes the device ID of the MFP 10D to the confirmation server 130, and acquires an inquiry result from the confirmation server 130 (S422 of FIG. 19). In the present case, the printing CSI is being stored in the memory 34 of the MFP 10D, but the MFP 10D is not connected with the print CL server 140. For example, in a case where an expiration date of the authentication information included in the printing CSI has expired, a case may happen where the MFP 10D cannot connect with the print CL server 140. In this case, the portable terminal 50 determines NO in S422 of FIG. 19, and changes the information indicating CP OK to information indicating CP NG (S424).

As described above, the response data received from the MFP 10D includes information indicating DP OK, EP OK, and CP OK. However, in the function confirmation process (S400 of FIG. 15), the response data is changed to information indicating DP OK, and information indicating EP NO and CP NG. Consequently, the portable terminal 50 selects DP from among the three print functions (i.e., DP, EP, CP) which the MFP 10D is capable of executing. Then, the portable terminal 50 prioritizes use of the normal Wi-Fi NW to send print data to the MFP 10D via the AP 100 (S54 of FIG. 15).

According to the present embodiment, it is possible to prevent the portable terminal 50 selecting a communication scheme which cannot be used to send print data from the portable terminal 50 to the MFP 10D (EP and CP in the case of FIG. 20). In the present embodiment, the MFP 10D and the portable terminal 50 can appropriately execute the communication of print data by using the communication scheme selected by the portable terminal 50 (DP in the case of FIG. 20).

Corresponding Relationships

In the case of FIG. 20, the SSID "X1" and the BSSID "Y1" included in the response data are an example of the "identification information". CP, DP, EP are respectively examples of the "first communication scheme", the "second communication scheme", and the "third communication scheme". The information included in the response data (i.e., DP OK, EP OK, CP OK) is an example of the "third data" and the "fourth data". The process of S404 and the process of S414 of FIG. 19 are respectively examples of the "determining . . . whether the terminal apparatus is belonging to the particular local area network" and the "determining whether second communication setting information . . . is stored in the memory of the terminal apparatus". The sending ESI, which is the determination target of S414, is an example of the "second communication setting information".

Fourth Embodiment

Points different from the first embodiment will be described. In the present embodiment, the MFP 10 executes the function selection process without the portable terminal 50 executing the function selection process.

Figure 21:
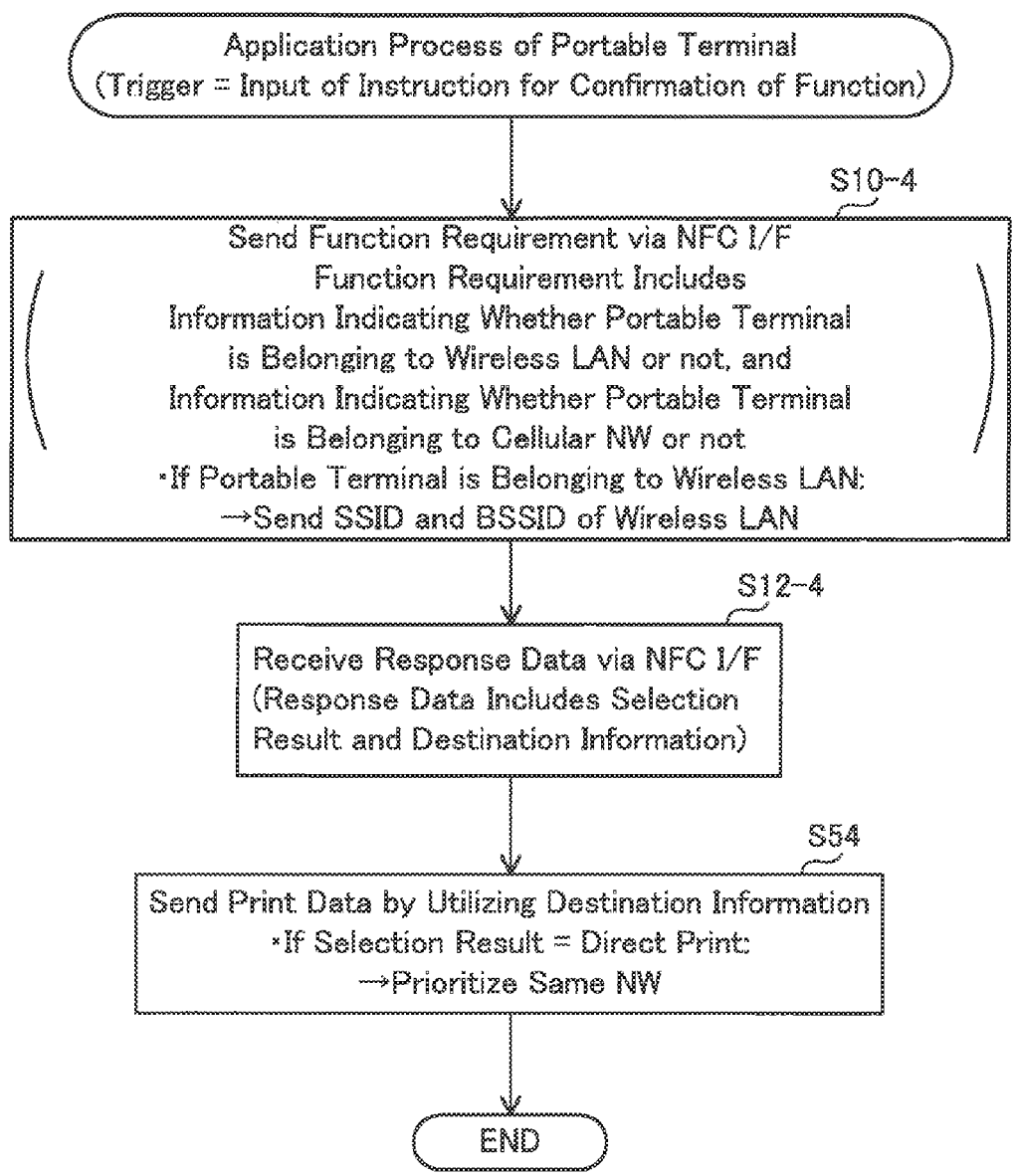
FIG. 21 shows a flowchart of an application process of a portable terminal of a fourth embodiment.

Application Process of Portable Terminal 50; FIG. 21

The contents of a process realized by the MFP application of the present embodiment will be described with reference to FIG. 21. A function request sent in S10-4 includes information indicating whether the portable terminal 50 is belonging to a wireless LAN, and information indicating whether the portable terminal 50 is belonging to a cellular NW. In a case where the portable terminal 50 is belonging to a wireless LAN (i.e., in a case where the normal Wi-Fi WSI or WFD WSI is being stored in the memory 74), the function request further includes the set of SSID and BSSID of that wireless LAN.

The MFP 10 can execute a function selection process (to be described, S30 of FIG. 22) by using this information.

The response data received in S12-4 includes the selection result (i.e., DP, EP, or CP) of the function selection process executed by the MFP 10, and destination information corresponding to the selection result. Next, in S54, by using the destination information corresponding to the selection result, the CPU 72 sends print data to the MFP 10 in accordance with the communication scheme corresponding to the selection result.

Figure 22:
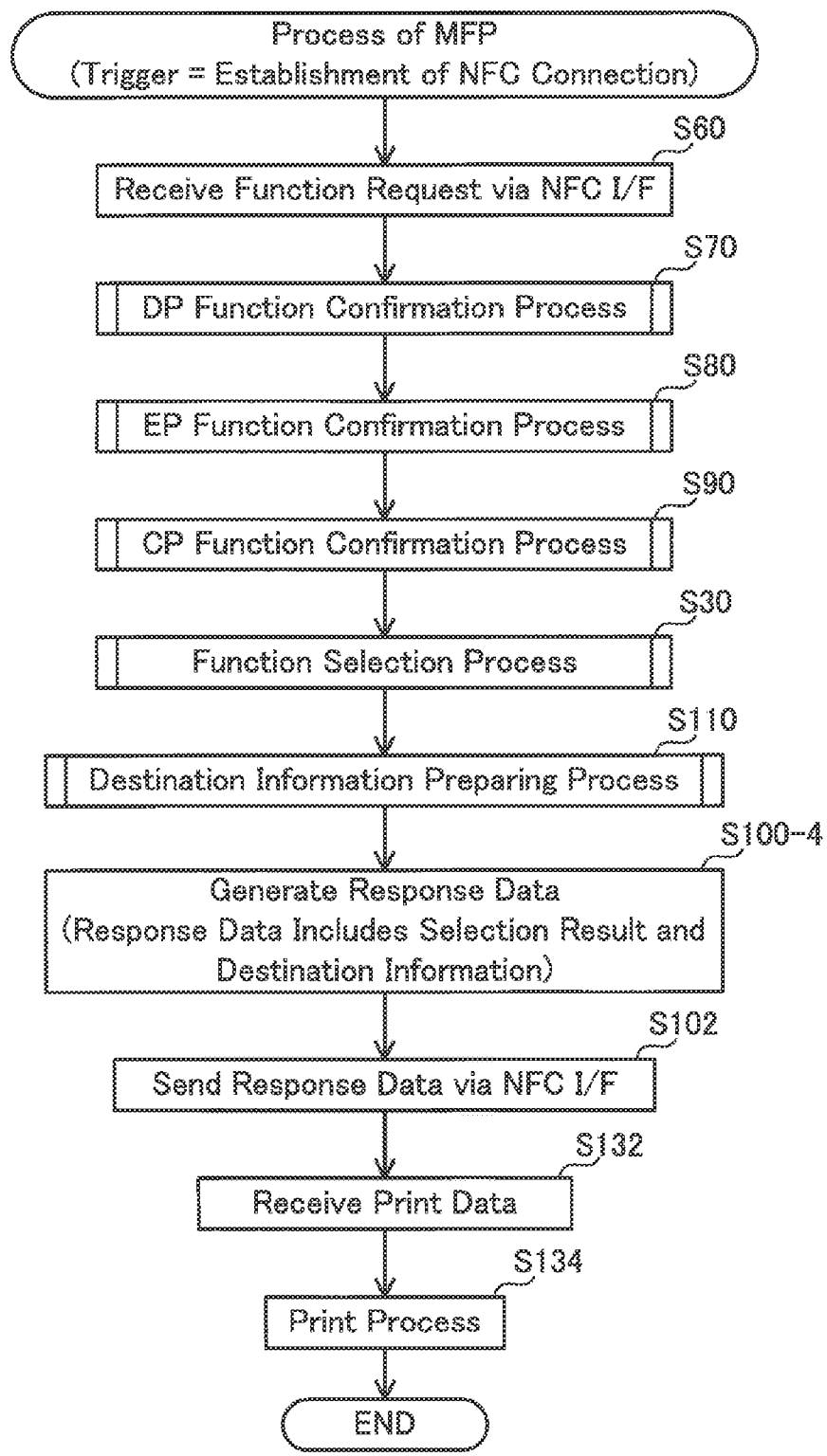
FIG. 22 shows a flowchart of a process of an MFP of the fourth embodiment.

Process of MFP; FIG. 22

Contents of a process executed by the MFP 10 of the present embodiment will be described with reference to FIG. 22. S60 to 90 are almost the same as S60 to 90 of FIG. 7. However, as described above, the function request received in S60 includes information indicating whether the portable terminal 50 is belonging to a wireless LAN, and information indicating whether the portable terminal 50 is belonging to a cellular NW. Further, the function request may include the set of SSID and BSSID of the wireless LAN to which the portable terminal 50 is belonging. Further, in S70, in a case where at least one of normal Wi-Fi print, WFD print, and BT print is OK, the CPU 32 stores information indicating DP OK in the memory 34, and in a case where all of normal Wi-Fi print, WFD print, and BT print are NO, the CPU 32 stores information indicating DP NG in the memory 34.

In S30, the CPU 32 executes the function selection process. Apart from the point that an executing body is the CPU 32, the function selection process of the present embodiment is the same as the function execution process of the first embodiment (see S30 of FIG. 3, FIG. 4 to FIG. 6). Moreover, in a case where a set of SSID and BSSID is included in the function request, the CPU 32 executes the process of S31 of FIG. 4 by using that set. Further, the CPU 32 executes the processes of S33 and S38 of FIG. 4 by using the information included in the function request (i.e., information indicating whether the portable terminal 50 is belonging to a wireless LAN, information indicating whether the portable terminal 50 is belonging to a cellular NW).

S110 of FIG. 22 is the same as S110 of FIG. 7 (i.e., FIG. 11). The response data sent in S100-4 includes the selection result of the function selection process of S30, and the destination information prepared in S110. S102, S132, S134 are the same as S102, S132, S134 of FIG. 7 respectively.

Specific Case; FIG. 23

A specific case realized by the processes of FIG. 21 and FIG. 22 will be described with reference to FIG. 23. An MFP 100E is capable of executing normal Wi-Fi print, BT print, EP, and CP, but is not capable of executing WFD print. The MFP 10E and the portable terminal 50 are belonging to a normal Wi-Fi NW (SSID "X1", BSSID "Y1") formed by the AP 100. Moreover, the portable terminal 50 is not belonging to a cellular NW.

In the present case, a function request sent from the portable terminal 50 to the MFP 10E includes information indicating that the portable terminal 50 is belonging to a wireless LAN, information indicating that the portable terminal 50 is not belonging to a cellular NW, and the set of SSID "X1" and BSSID "Y1" of the normal Wi-Fi NW to which the portable terminal 50 is belonging (S10-4 of FIG. 21).

Upon receiving the function request from the portable terminal 50 (S60 of FIG. 22), the MFP 100E executes the function confirmation processes (S70 to 90 of FIG. 22), and stores information indicating DP OK, information indicating EP OK, and information indicating CP OK in the memory 34.

In the present case, since the function request includes a set of SSID and BSSID identical to the set of SSID "X1" and BSSID "Y1" included in the normal Wi-Fi WSI of the MFP 10E (YES in S31 of FIG. 4), the MFP 10E selects DP from among the three print functions (i.e., DP, EP, CP) which the MFP 10E is capable of executing (S32 of FIG. 4).

The response data sent to the portable terminal 50 from the MFP 10E includes not only the selection result indicating DP, but also the normal Wi-Fi WSI (i.e., "X1, Y1, IP1") and the BT WSI (S102 of FIG. 22). The portable terminal 50 prioritizes use of the normal Wi-Fi NW to send print data to the MFP 10E via the AP 100 (S54 of FIG. 21).

Corresponding Relationships

In the case of FIG. 23, DP, EP, and CP are an example of the "M1 items of communication schemes", and DP is an example of the "particular communication scheme". The process of S30, the process of S102, and the process of S132 of FIG. 22 are respectively examples of the "selecting", the "sending a selection result", and the "receiving particular print data".

Fifth Embodiment

Points different from the fourth embodiment will be described. In the present embodiment, the MFP 10 executes the DP function confirmation process of S70 of FIG. 22 in accordance with a flowchart different from that of FIG. 8.

DP Function Confirmation Process; FIG. 24

The DP function confirmation process of S70 of FIG. 22 will be described with reference to FIG. 24. S700, S702 are the same as S71, S73 of FIG. 8. Moreover, in a case where the determination of S700 is YES, processing proceeds to S704, and in a case where the determination of S700 is NO, processing proceeds to S702. Further, upon ending S702, processing proceeds to S720. In S704, the CPU 32 determines whether the MFP 10 and the portable terminal 50 are belonging to the same normal Wi-Fi NW. In a case where the normal Wi-Fi WSI of the MFP 10 is not being stored in the memory 34, the CPU 32 determines NO in S704, and proceeds to S708.

In a case where the normal Wi-Fi WSI of the MFP 10 is being stored in the memory 34, the CPU 32 determines whether a set of SSID and BSSID (called "third set" below) which is identical to the set of normal Wi-Fi SSID and normal Wi-Fi BSSID included in the normal Wi-Fi WSI, is included in the function request. In a case where the third set is included in the function request, the CPU 32 determines YES in S704, and proceeds to S706, and in a case where the third set is not included in the function request, the CPU 32 determines NO in S704, and proceeds to S708.

In S706, the CPU 32 stores information indicating normal Wi-Fi print OK in the memory 34. Further, in S708, the CPU 32 stores information indicating normal Wi-Fi print NG in the memory 34. When S706 or S708 ends, processing proceeds to S710.

S710, S718 are the same as S74, S76 of FIG. 8. Moreover, in a case where the determination of S710 is YES, processing proceeds to S712, and in a case where the determination of S710 is NO, processing proceeds to S718. Further, upon ending S718, processing proceeds to S720. In S712, the CPU 32 determines whether the current state of the MFP 10 is the CL state. In a case where the current state of the MFP 10 is the CL state, the CPU 32 determines YES in S712, and proceeds to S714, and in a case where the current state of the MFP 10 is the G/O state or device state, the CPU 32 determines NO in S712, and proceeds to S716.

In S714, the CPU 32 determines whether the MFP 10 and the portable terminal 50 are belonging to the same WFD NW. In a case where the WFD WSI of the MFP 10 is being stored in the memory 34, the CPU 32 determines whether a set of SSID and BSSID (called "fourth set" below) which is identical to the set of WFD SSID and WFD BSSID included in the WFD WSI is included in the function request. In a case where the fourth set is included in the function request, the CPU 32 determines YES in S714, and proceeds to S716, and in a case where the fourth set is not included in the function request, the CPU 32 determines NO in S714, and proceeds to S718. S716 to S724 are the same as S75 to S79 of FIG. 8.

In a case where the MFP 10 and the portable terminal 50 are not belonging to the same normal Wi-Fi NW, the MFP 10 and the portable terminal 50 cannot execute communication of print data by using the normal Wi-Fi scheme. This is because the password included in the normal Wi-Fi WSI of the MFP 10 is not sent to the portable terminal 50 from the MFP 10 (S303 of FIG. 17), and consequently the portable terminal 50 cannot participate in the normal Wi-Fi NW to which the MFP 10 is belonging. Consequently, in the present embodiment, even if the MFP 10 has the normal Wi-Fi print function, in a case where the MFP 10 and the portable terminal 50 are not belonging to the same normal Wi-Fi NW (NO in S704), the MFP 10 stores normal Wi-Fi print NG in the memory 34 (S708).

In a case where the MFP 10 is in the CL state and the MFP 10 and the portable terminal 50 are not belonging to the same WFD NW, the MFP 10 and the portable terminal 50 cannot execute communication of print data by using the WFD scheme. This is because the password included in the WFD WSI of the MFP 10 is not sent from the MFP 10 to the portable terminal 50 (see the case of "MFP=CL" of S305 of FIG. 17), and consequently the portable terminal 50 cannot participate in the WFD NW to which the MFP 10 is belonging. Consequently, in the present embodiment, even if the MFP 10 has the WFD print function, in a case where the MFP 10 is in the CL state and the MFP 10 and the portable terminal 50 are not belonging to the same WFD NW (NO in S714), the MFP 10 stores WFD print NG in the memory 34 (S718).

Thus, in the present embodiment, the MFP 10 can be caused to appropriately store information relating to normal Wi-Fi print (OK or NG), and information relating to WFD print (OK or NG) in the memory 34 in accordance with the situation of the MFP 10 and the portable terminal 50. Consequently, in S30 of FIG. 22, the MFP 10 can appropriately execute the selection relating to DP.

Specific Case; FIG. 25

A specific case realized by the processes of FIG. 21 and FIG. 22 (particularly S70 (FIG. 24)) will be described with reference to FIG. 25. An MFP 10F is belonging to a normal Wi-Fi NW (SSID "X1", BSSID "Y1") formed by the AP 100. Further, the MFP 10F belongs, as a CL device, to a WFD NW (SSID "X3", BSSID "Y3") formed by the PC 110. The MFP 10F is capable of executing EP, but is not capable of executing BT print and CP. The portable terminal 50 is not belonging to a wireless LAN, but is belonging to a cellular NW.

In the present case, a function request sent from the portable terminal 50 to the MFP 10F includes information indicating that the portable terminal 50 is not belonging to a wireless LAN, and information indicating that the portable terminal 50 is belonging to a cellular NW.

Since the function request does not include a set identical to the set of normal Wi-Fi SSID "X1" and normal Wi-Fi BSSID "Y1" included in the normal Wi-Fi WSI of the MFP 10F (NO in S704 of FIG. 24), the MFP 10F stores information indicating normal Wi-Fi print NG in the memory 34 (S708). Further, since the MFP 10F has the CL state (YES in S712) and, further, the function request does not include a set identical to the set of WFD SSID "X3" and WFD BSSID "Y3" included in the WFD WSI of the MFP 10F (NO in S714), the MFP 10F stores information indicating WFD print NG in the memory 34 (S718). Further, since the MFP 10F is not capable of executing BT print (NO in S720), the MFP 10F stores information indicating BT print NG in the memory 34 (S724).

Since all of normal Wi-Fi print, WFD print, and BT print are NO, the MFP 10F stores information indicating DP NG in the memory 34. Thus, the MFP 10F stores information indicating DP NG in the memory 34 despite being capable of executing normal Wi-Fi print and WFD print. Consequently, in the second selection process (to be described, see FIG. 6), the MFP 10F does not select DP, which is not available to the MFP 10F to execute the communication of print data.

Since the MFP 10F is capable of executing EP, the MFP 10F stores information indicating EP OK in the memory 34 (S83 of FIG. 9). Further, since the MFP 10F is capable of executing CP, the MFP 10F stores information indicating CP OK in the memory 34 (S94 of FIG. 10).

As described above, the function request includes information indicating that the portable terminal 50 is belonging to a cellular NW. Consequently, the MFP 10F determines YES in S38 of FIG. 4, and executes the second selection process (S160). Then, the MFP 10F selects CP from among the two print functions (EP, CP) which the MFP 10F is capable of executing (YES in S163 of FIG. 6). The MFP 10F sends, to the portable terminal 50, response data which includes the selection result indicating CP, and the printing CST, which is the destination information corresponding to CP (S102 of FIG. 22).

Upon receiving the response data from the MFP 10F (S12-4 of FIG. 21), the portable terminal 50 sends print data to the print CL server 140 via the cellular NW I/F 66 by using the printing CSI included in the response data. According to this, the print data is sent to the MFP 10F via the print CL server 140.

Corresponding Relationships

In the case of FIG. 25, DP is an example of the "second communication scheme". EP and CP are an example of the "M1 items of communication schemes not including a second communication scheme". The process of S60 of FIG. 22 is an example of the "receiving identification information", and the processes S704 and 714 of FIG. 24 are an example of "determining . . . whether the function executing apparatus is belonging to the particular local area network".

Variant 1

In S93 of FIG. 10, the CPU 32 of the MFP 10 stores information indicating CP OK or information indicating CP NG in the memory 34 by determining whether the MFP 10 is capable of communicating with the confirmation server 130 on the Internet. Instead, the CPU 32 may determine YES in S93 in a case where the MFP 10 is connected with the AP 100 (i.e., in a case where the normal Wi-Fi WSI is being stored in the memory 34), and may determine NO in S93 in a case where the MFP 10 is not connected with the AP 100 (i.e., in a case where the normal Wi-Fi WSI is not being stored in the memory 34). The AP 100 usually comprises a function of relaying communication between the wireless LAN and the Internet. Consequently, in a case where the MFP 10 is connected with the AP 100, the MFP 10 is usually capable of executing Internet communication. Consequently, by determining whether the MFP 10 is connected with the AP 100, the CPU 32 can appropriately determine whether the MFP 10 is capable of executing Internet communication (i.e., whether the MFP 10 is capable of communicating with the print CL server 140).

Variant 2

In S12 of FIG. 3, instead of receiving response data which includes information indicating DP OK, etc., the CPU 72 of the portable terminal 50 may receive response data which includes the device ID or model name of the MFP 10. In this case, the CPU 72 sends an inquiry signal that includes the device ID or a model name of the MFP 10 to the confirmation server 130, and receives an inquiry result from the confirmation server 130. The confirmation server 130 is storing, in association with the device ID or model name of the MFP 10, information indicating which print functions (DP, EP, CP) the MFP 10 is capable of executing. The information is stored in advance in the confirmation server 130 by the vendor of the MFP 10. For example, in a case where the MFP 10 does not have the EP function and the CP function, the vendor stores information indicating DP OK, EP NG, and CP NG in the confirmation server 130 in association with the device ID or model name of the MFP 10. In case of receiving an inquiry signal, from the portable terminal 50, that includes the device ID or model name of the MFP 10, the confirmation server 130 sends an inquiry result, to the portable terminal 50, that includes information indicating which print functions (DP, EP, CP) the MFP 10 is capable of executing. The CPU 72 of the portable terminal 50 selects the print function in S30 of FIG. 3 in accordance with the inquiry result. In the present variant, also, the CPU 72 can select the print functions which the MFP 10 is capable of executing. In the present variant, the device ID or model name of the MFP 10 is an example of the "first information".

Variant 3

In variant 2, the confirmation server 130 may further store print conditions which the MFP 10 is capable of executing (e.g., a paper size which the MFP 10 is capable of using, a range of print resolutions which the MFP 10 is capable of using, etc.) in association with the device ID or model name of the MFP 10. Then, in case of receiving an inquiry signal that includes the device ID or model name of the MFP 10 from the portable terminal 50, the confirmation server 130 sends an inquiry result, to the portable terminal 50, that includes information indicating whether the MFP 10 is capable of executing any print functions (DP, EP, CP), and information indicating the print conditions which the MFP 10 is capable of executing. In accordance with the inquiry result, the CPU 72 of the portable terminal 50 generates display data indicating the print conditions included in the inquiry result, and supplies the display data to the display mechanism 54. According to this, the user can select the print conditions.

Then, in S50 of FIG. 3, the CPU 72 may send, to the MFP 10, a selection result which indicates not only the print function (e.g., "DP") selected by the CPU 72, but also the print conditions selected by the user (e.g., paper size "A4", print resolution "200 Dpi"). Then, in S134 of FIG. 7, the CPU 32 of the MFP 10 may execute the print process in accordance with the print conditions indicated by the selection result by the portable terminal 50.

Variant 4

The "first interface" is not limited to the NFC I/F 62, but may be e.g., a TJ I/F for executing a Transfer Jet wireless communication. Moreover, in case of intending to speed up a communication speed of Transfer Jet wireless communication, the communication speed of a wireless communication via the wireless LAN I/F 60 may be slower than the communication speed of a wireless communication via the TJ I/F. That is, the communication speed of a wireless communication via the "second interface" may be faster than; or slower than, the communication speed of a wireless communication via the "first interface". In general terms, it is sufficient for a communicable range of wireless communication via the "second interface" to be greater than a communicable range of wireless communication via the "first interface".

Variant 5

The "function executing apparatus" is not limited to the MFP 10, but may be another communication apparatus capable of executing the print function (printer, FAX apparatus, copier, etc.).

Variant 6

In the above embodiments, the wireless network is formed by the MFP 10 and the portable terminal 50 executing WFD communication. Instead, by activating a so-called Soft AP, the CPU 32 of the MFP 10 may form a wireless network in which the MFP 10 operates as an AP.

Variant 7

In the above embodiments, when a WFD NW is to be newly formed, the MFP 10 becomes the G/O device. Instead, the portable terminal 50 may become the G/O device. Further, by activating a so-called Soft AP, the CPU 72 of the portable terminal 50 may form a wireless network in which the portable terminal 50 operates as an AP.

Variant 8

The CPU 72 of the portable terminal 50 may receive designation of the print data at any timing during the processes of FIG. 3. For example, the CPU 72 may receive designation of the print data before sending the function request to the MFP 10 via the NFC I/F 62 (i.e., before S10 of FIG. 3), or may receive designation of the print data immediately before sending the print data to the MFP 10 (i.e., immediately before S54).

Variant 9

In the above embodiments, CP is prioritized over EP in the first selection process (FIG. 5) and the second selection process (FIG. 6) (S151, S153 of FIG. 5, S163, S165 of FIG. 6). Instead, EP may be prioritized over CP.

Variant 10

In the above embodiments, in a case where the portable terminal 50 is belonging to a wireless LAN (YES in S33 of FIG. 4), and CP or EP was selected (S152, S154 of FIG. 5), the CPU 72 executes an internet communication via the wireless LAN I/F 60 (S54 of FIG. 3). On the other hand, in a case where the portable terminal 50 is not belonging to a wireless LAN (NO in S33 of FIG. 4), is belonging to a cellular NW (YES in S38), and CP or EP was selected (S164, S166 of FIG. 6), the CPU 72 executes an internet communication via the cellular NW I/F 66 (S54 of FIG. 3). That is, in the above embodiments, internet communication using a wireless LAN, which is not subject to being charged for at a metered rate, is prioritized over internet communication using a cellular NW. Instead, internet communication using a cellular NW may be prioritized over internet communication using a wireless LAN.

Variant 11

In the above embodiments, the processes of FIG. 3, FIG. 7, etc. are realized by the CPUs 32, 72 of the MFP 10 and the portable terminal 50 executing programs (i.e., software) within the memories 34, 74. Instead, at least one of the processes may be realized by hardware such as a logic circuit, etc.

What is claimed is:

1. A terminal apparatus comprising:
a processor; and
a memory configured to store an SSID and a BSSID of a first local area network to which the terminal apparatus belongs, the memory further storing computer-readable instructions therein, the computer-readable instructions, when executed by the processor, causing the terminal apparatus to perform:
receiving particular information from a printer via a near field communication scheme, the particular information including, in a case where the printer belongs to a second local area network, identification information for identifying the second local area network, the identification information including at least one of an SSID and a BSSID of the second local area network;
determining whether the identification information included in the particular information is stored in the memory of the terminal apparatus;
selecting a direct communication scheme from among a plurality of communication schemes including the direct communication scheme in a case where it is determined that the identification information is stored in the memory of the terminal apparatus, the direct communication scheme being a communication scheme in which the printer receives print data not via the internet by using the second local area network;
sending a direct selection result indicating the direct communication scheme to the printer via the near field communication scheme in a case where the direct communication scheme is selected;
receiving an IP address of the printer from the printer via the near field communication scheme in response to sending the direct selection result to the printer;
sending particular print data to the printer via the first local area network, which is identical to the second local area network, according to the direct communication scheme by using the IP address of the printer;
determining, in a case where it is determined that the identification information is not stored in the memory of the terminal apparatus, whether the particular information indicates that the printer is configured to be capable of using a cloud communication scheme, the cloud communication scheme being a communication scheme in which the printer receives print data via the internet from a cloud server;
selecting the cloud communication scheme from among the plurality of communication schemes including the cloud communication scheme in a case where it is determined that the particular information indicates that the printer is configured to be capable of using the cloud communication scheme;
sending a cloud selection result indicating the cloud communication scheme to the printer via the near field communication scheme in a case where the cloud communication scheme is selected;
receiving location information of the cloud server from the printer according to the near field communication scheme in response to sending the cloud selection result to the printer;
sending the particular print data to the cloud server via the internet according to the cloud communication scheme by using the location information;
determining, in a case where it is determined that the particular information indicates that the printer is configured not to be capable of using the cloud communication scheme, whether the particular information indicates that the printer is configured to be capable of using an electronic mail communication scheme, the electronic mail communication scheme being a communication scheme in which the printer receives an e-mail including print data via the internet;
selecting the electronic mail communication scheme from among the plurality of communication schemes including the electronic mail communication scheme in a case where it is determined that the particular information indicates that the printer is configured to be capable of using the electronic mail communication scheme;
sending an electronic mail selection result indicating the electronic mail communication scheme to the printer via the near field communication scheme in a case where the electronic mail communication scheme is selected;
receiving an electronic mail address of the printer according to the near field communication scheme in response to sending the electronic mail selection result to the printer; and
sending a particular e-mail including the particular print data to the printer via the internet according to the electronic mail communication scheme by using the electronic mail address.

2. The terminal apparatus as in claim 1, wherein:
in a case where first communication setting information for a communication via the internet is stored in the printer, the particular information indicates that the printer is configured to be capable of using the cloud communication scheme, and
in a case where the first communication setting information is not stored in the printer, the particular information indicates that the printer is configured not to be capable of using the cloud communication scheme.

3. The terminal apparatus as in claim 1, wherein:
in a case where the printer receives a response after sending a signal to a server on the internet, the particular information indicates that the printer is configured to be capable of using the cloud communication scheme, and
in a case where the printer does not receive the response despite sending the signal to the server, the particular information indicates that the printer is configured not to be capable of using the cloud communication scheme.

4. The terminal apparatus as in claim 1, wherein:
in a case where the particular information indicates that the printer is configured to be capable of using the direct communication scheme, the particular information includes the identification information.

5. A printer comprising:
a processor; and
a memory configured to store an SSID and a BSSID of a second local area network to which the printer belongs, the memory further storing computer-readable instructions therein, the computer-readable instructions, when executed by the processor, causing the printer to perform:
 receiving, from a terminal apparatus via a near field communication scheme, belonging information indicating whether the terminal apparatus belongs to a first local area network, the belonging information including, in a case where the terminal apparatus belongs to the first local area network, identification information for identifying the first local area network, the identification information including at least one of an SSID and a BSSID of the first local area network;
 determining whether the identification information included in the belonging information is stored in the memory of the printer;
 selecting a direct communication scheme from among a plurality of communication schemes including the direct communication scheme in a case where it is determined that the identification information is stored in the memory of the printer, the direct communication scheme being a communication scheme in which the printer receives print data not via the internet by using the second local area network;
 sending, to the terminal apparatus via the near field communication scheme, a direct selection result indicating the direct communication scheme and an IP address of the printer in a case where the direct communication scheme is selected;
 receiving particular print data from the terminal apparatus via the second local area network, which is identical to the first local area network, according to the direct communication scheme, the particular print data being sent from the terminal apparatus to the printer by using the IP address of the printer;
 determining, in a case where it is determined that the identification information is not stored in the memory of the printer, whether the printer is configured to be capable of using a cloud communication scheme, the cloud communication scheme being a communication scheme in which the printer receives print data via the internet from a cloud server;
 selecting the cloud communication scheme from among the plurality of communication schemes including the cloud communication scheme in a case where it is determined that the printer is configured to be capable of using the cloud communication scheme;
 sending, to the terminal apparatus via the near field communication scheme, a cloud selection result indicating the cloud communication scheme and location information of the cloud server in a case where the cloud communication scheme is selected;
 receiving the particular print data from the cloud server via the internet according to the cloud communication scheme, the particular print data being sent from the terminal apparatus to the cloud server by using the location information of the cloud server;
 determining, in a case where it is determined that the printer is configured not to be capable of using the cloud communication scheme, whether the printer is configured to be capable of using an electronic mail communication scheme, the electronic mail communication scheme being a communication scheme in which the printer receives an e-mail including print data via the internet;
 selecting the electronic mail communication scheme from among the plurality of communication schemes including the electronic mail communication scheme in a case where it is determined that the printer is configured to be capable of using the electronic mail communication scheme;
 sending, to the terminal apparatus via the near field communication scheme, an electronic mail selection result indicating the electronic mail communication scheme and an electronic mail address of the printer in a case where the electronic mail communication scheme is selected; and
 receiving a particular e-mail including the particular print data from the terminal apparatus via the internet according to the electronic mail communication scheme, the particular e-mail being sent from the terminal apparatus to the printer by using the electronic mail address of the printer.

6. The printer as in claim 5, wherein:
it is determined that the printer is configured to be capable of using the cloud communication scheme in a case where first communication setting information for a communication via the internet is stored in the memory of the printer; and
it is determined that the printer is configured not to be capable of using the cloud communication scheme in a case where the first communication setting information is not stored in the memory of the printer.

7. The printer as in claim 5, wherein:
it is determined that the printer is configured to be capable of using the cloud communication scheme in a case where the printer sends a signal to a server on the internet and receives a response; and
it is determined that the printer is configured not to be capable of using the cloud communication scheme in a case of not receiving the response despite sending the signal to the server.

8. A non-transitory computer-readable storage medium storing computer-readable instructions for a terminal apparatus that includes: (a) a processor, and (b) a memory configured to store an SSID and a BSSID of a first local area network to which the terminal apparatus belongs, wherein the computer-readable instructions, when executed by a processor of the terminal apparatus, cause the terminal apparatus to perform:
 receiving particular information from a printer via a near field communication scheme, the particular information including, in a case where the printer belongs to a second local area network, identification information for identifying the second local area network, the identification information including at least one of an SSID and a BSSID of the second local area network;
 determining whether the identification information included in the particular information is stored in the memory of the terminal apparatus;
 selecting a direct communication scheme from among a plurality of communication schemes including the direct communication scheme in a case where it is determined that the identification information is stored in the memory of the terminal apparatus, the direct communication scheme being a communication scheme in which the printer receives print data not via the internet by using the second local area network;

sending a direct selection result indicating the direct communication scheme to the printer via the near field communication scheme in a case where the direct communication scheme is selected;

receiving an IP address of the printer from the printer via the near field communication scheme in response to sending the direct selection result to the printer;

sending particular print data to the printer via the first local area network, which is identical to the second local area network, according to the direct communication scheme by using the IP address of the printer;

determining, in a case where it is determined that the identification information is not stored in the memory of the terminal apparatus, whether the particular information indicates that the printer is configured to be capable of using a cloud communication scheme, the cloud communication scheme being a communication scheme in which the printer receives print data via the internet from a cloud server;

selecting the cloud communication scheme from among the plurality of communication schemes including the cloud communication scheme in a case where it is determined that the particular information indicates that the printer is configured to be capable of using the cloud communication scheme;

sending a cloud selection result indicating the cloud communication scheme to the printer via the near field communication scheme in a case where the cloud communication scheme is selected;

receiving location information of the cloud server from the printer according to the near field communication scheme in response to sending the cloud selection result to the printer;

sending the particular print data to the cloud server via the internet according to the cloud communication scheme by using the location information;

determining, in a case where it is determined that the particular information indicates that the printer is configured not to be capable of using the cloud communication scheme, whether the particular information indicates that the printer is configured to be capable of using an electronic mail communication scheme, the electronic mail communication scheme being a communication scheme in which the printer receives an e-mail including print data via the internet;

selecting the electronic mail communication scheme from among the plurality of communication schemes including the electronic mail communication scheme in a case where it is determined that the particular information indicates that the printer is configured to be capable of using the electronic mail communication scheme;

sending an electronic mail selection result indicating the electronic mail communication scheme to the printer via the near field communication scheme in a case where the electronic mail communication scheme is selected;

receiving an electronic mail address of the printer according to the near field communication scheme in response to sending the electronic mail selection result to the printer; and sending a particular e-mail including the particular print data to the printer via the internet according to the electronic mail communication scheme by using the electronic mail address.

* * * * *